United States Patent
O'Brien et al.

(10) Patent No.: US 9,574,333 B2
(45) Date of Patent: Feb. 21, 2017

(54) SINK SYSTEM

(71) Applicant: Kohler Co., Kohler, WI (US)

(72) Inventors: Sarah O'Brien, Sheboygan, WI (US); Terrence K. Mahon, Whitefish Bay, WI (US); Ryan R. Detlaff, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 283 days.

(21) Appl. No.: 14/481,539

(22) Filed: Sep. 9, 2014

(65) Prior Publication Data

US 2015/0067962 A1    Mar. 12, 2015

Related U.S. Application Data

(60) Provisional application No. 61/875,958, filed on Sep. 10, 2013.

(51) Int. Cl.
*E03C 1/18*    (2006.01)
*A47J 47/20*   (2006.01)
*A47J 47/00*   (2006.01)

(52) U.S. Cl.
CPC .............. *E03C 1/18* (2013.01); *A47J 47/005* (2013.01); *A47J 47/20* (2013.01)

(58) Field of Classification Search
CPC ............ A47J 47/20; A47J 47/005; E03C 1/18; E03C 1/182; E03C 1/186; E03C 1/32; E03C 1/322; E03C 2201/90; A47K 1/00
USPC .................... 4/630, 631, 637, 654, 656, 657
See application file for complete search history.

(56) References Cited

U.S. PATENT DOCUMENTS

| | | | |
|---|---|---|---|
| 62,082 A * | 2/1867 | Smith | A47L 19/02 4/656 |
| 275,755 A * | 4/1883 | Elliot et al. | E03C 1/18 4/286 |
| 917,278 A | 4/1909 | Fike | |
| 3,622,032 A | 11/1971 | Tilche | |
| 5,341,953 A | 8/1994 | Forester | |
| 5,381,562 A | 1/1995 | Holloway et al. | |
| 5,984,129 A | 11/1999 | Pasinski | |
| 6,182,305 B1 * | 2/2001 | O'Connell | A47B 77/02 269/289 R |
| 7,703,631 B2 | 4/2010 | Chafe et al. | |
| 7,854,030 B2 | 12/2010 | Lee et al. | |
| 2002/0027091 A1 | 3/2002 | Brown | |
| 2004/0206761 A1 | 10/2004 | Frantz | |
| 2006/0137379 A1 * | 6/2006 | Cawthon | A22C 17/08 62/285 |
| 2010/0275369 A1 | 11/2010 | Eilmus et al. | |
| 2013/0241127 A1 * | 9/2013 | Yang | A47J 47/005 269/15 |

* cited by examiner

*Primary Examiner* — J. Casimer Jacyna
(74) *Attorney, Agent, or Firm* — Foley & Lardner LLP

(57) ABSTRACT

A sink system includes a sink basin. The sink basin includes a bottom surface having a drain; one or more walls extending upward from the bottom surface; one or more ledges formed on at least one wall; and one or more sink accessories configured to be removably and slidably positioned on at least one of the one or more ledges, each of the one or more sink accessories being sized and shaped to fit within the sink basin. The one or more sink accessories are configured to assist with one or more tasks.

20 Claims, 19 Drawing Sheets

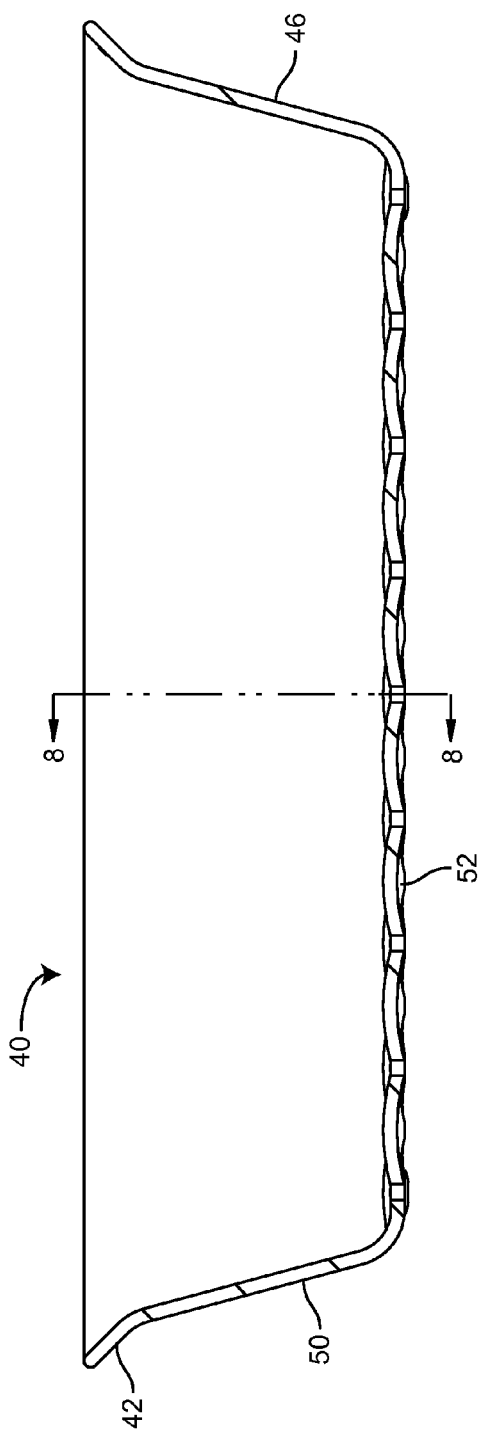
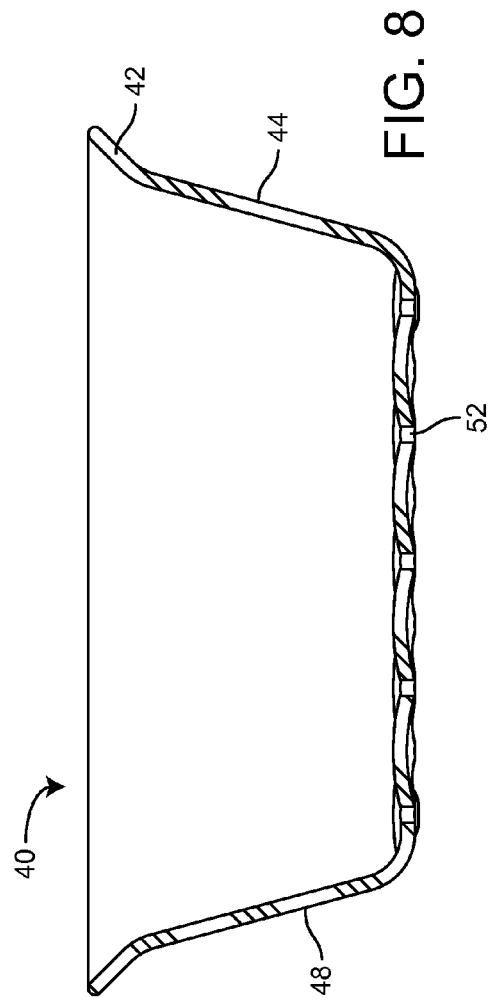
FIG. 7
FIG. 8

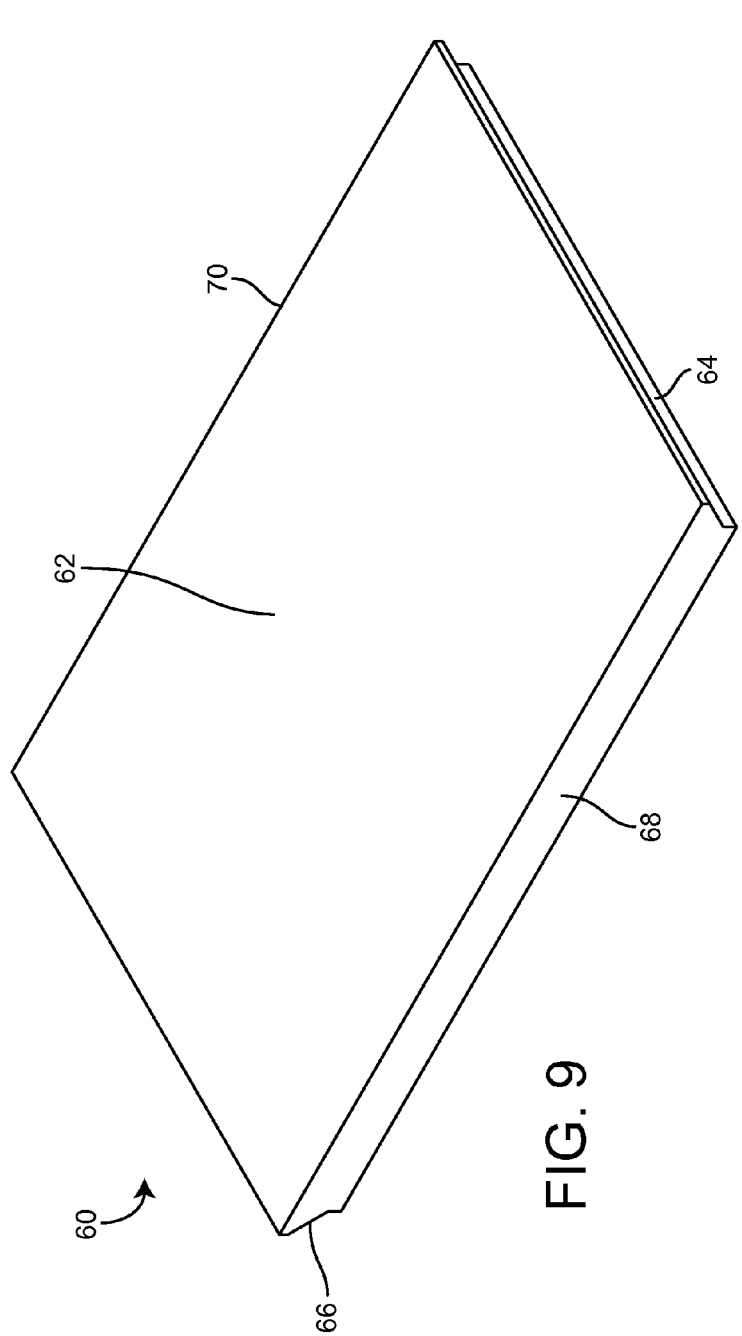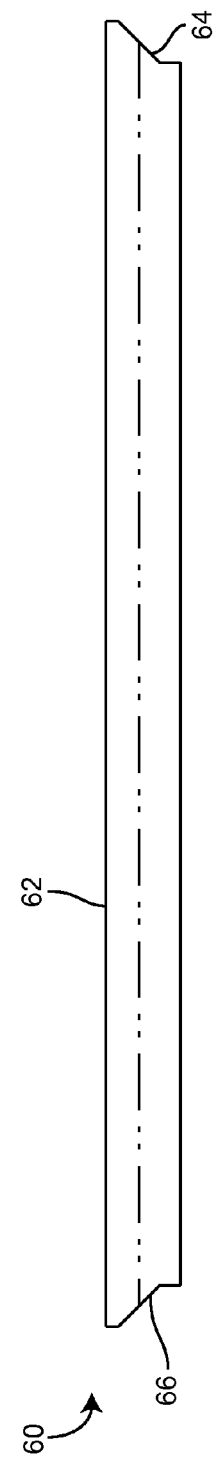

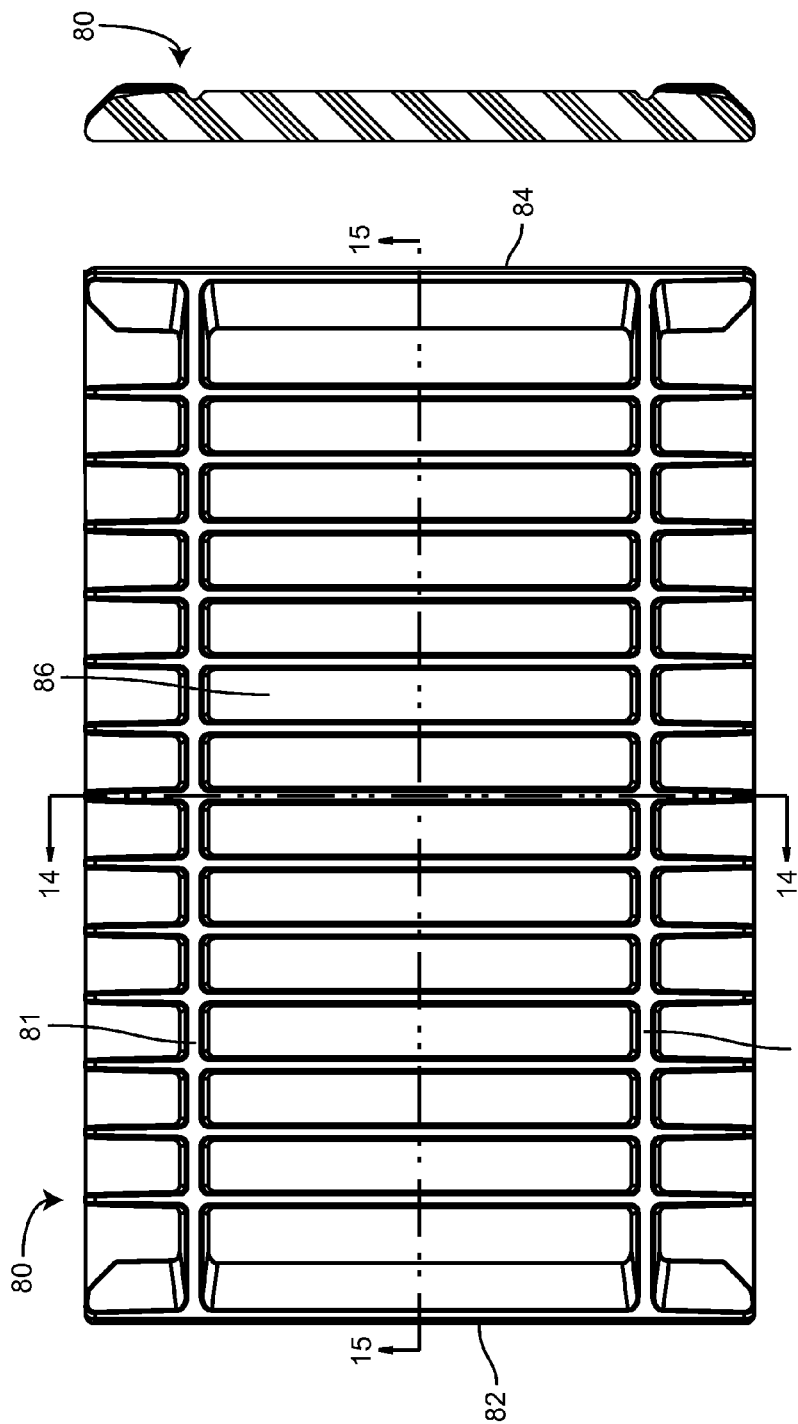

SINK SYSTEM

CROSS-REFERENCE TO RELATED PATENT APPLICATIONS

This application claims the benefit of U.S. Provisional Application No. 61/875,958, filed Sep. 10, 2013, the disclosure of which is incorporated by reference herein in its entirety.

BACKGROUND

The present application relates to a sink system. Particularly, the present application relates to a multi-function sink system and methods for adjusting the working height of a sink.

Sinks, and particularly kitchen sinks, often serve more than one function for a user of the sink. Kitchen sinks, for example, are frequently used for many tasks associated with the cooking process. For instance, the user may use the sink to clean the user's hands, to clean food products, to store, rinse, and/or clean used dishes or cookware, to unpack, stage, and/or cut the food products before cooking, to dispose of uneaten food, or for any number of other tasks associated with the cooking process. A typical sink basin may not be optimally suited for all of these varied tasks.

Kitchen sinks generally include a single or double sink basin, with each sink basin having a bottom surface. Typically, the bottom surface of the basin is stationary and positioned at a height above the floor (i.e., bottom surface height). Often, the bottom surface is used to assist with certain cooking-related tasks. For example, the bottom surface may provide a support surface for cleaning (i.e., scrubbing) cookware, a staging area for arranging or preparing food, and/or a repository for food waste and/or used dishes. However, the single bottom surface height may not be conducive to all tasks typically performed within the sink basin. For instance, a relatively deep sink basin having a relatively lower bottom surface height may be conducive to tasks that involve large objects, such as deeper pots and pans, while a shallower basin may be more desirable for certain heavy duty tasks (e.g., mixing, scrubbing, cleaning, etc.), precision tasks (e.g., staging, sorting, etc.), or light duty tasks (e.g., peeling, cutting, etc.). Therefore, a typical sink basin may not provide the proper support to efficiently perform many sink-related or cooking-related tasks.

It would be advantageous to provide a sink that addresses one or more of the above-identified issues, and accessories for use in such a sink.

SUMMARY

One embodiment relates to a sink system including a sink basin. The sink basin includes a bottom surface having a drain; one or more walls extending upward from the bottom surface; one or more ledges formed on at least one wall; and one or more sink accessories configured to be removably and slidably positioned on at least one of the one or more ledges, each of the one or more sink accessories being sized and shaped to fit within the sink basin. The one or more sink accessories are configured to assist with one or more tasks.

Another embodiment relates to a sink basin. The sink basin includes a bottom surface having a drain; a first wall extending upward from the bottom surface; a second wall extending upward from the bottom surface and positioned opposite of and substantially parallel to the second wall; and a first set of ledges formed at a first height on each of the first and second walls. The first set of ledges are configured to support one or more sink accessories.

Yet another embodiment relates to a sink basin. The sink basin includes a bottom surface; at least two walls; a first ledge formed on each of the at least two walls and positioned at a first height relative to the bottom surface; and a second ledge formed on each of the at least two walls and positioned above the first ledge at a second height relative to the bottom surface. Each of the first and second ledges are joined together by a transition, wherein the transition is angled inward toward a center of the basin from the first ledge to the second ledge.

BRIEF DESCRIPTION OF THE DRAWINGS

FIG. 7 is a cross-sectional view of the colander taken along line 7-7 in FIG. 6.

FIG. 8 is a cross-sectional view of the colander taken along line 8-8 in FIG. 6.

FIG. 9 is a top perspective view of a cutting board according to an exemplary embodiment.

FIG. 10 is a side view of the cutting board of FIG. 9.

FIG. 13 is a top view of the grate of FIG. 12.

FIG. 14 is a cross-sectional view of the grate taken along line 14-14 in FIG. 13.

FIG. 15 is a cross-sectional view of the grate taken along line 15-15 in FIG. 13.

DETAILED DESCRIPTION

Figure 1:
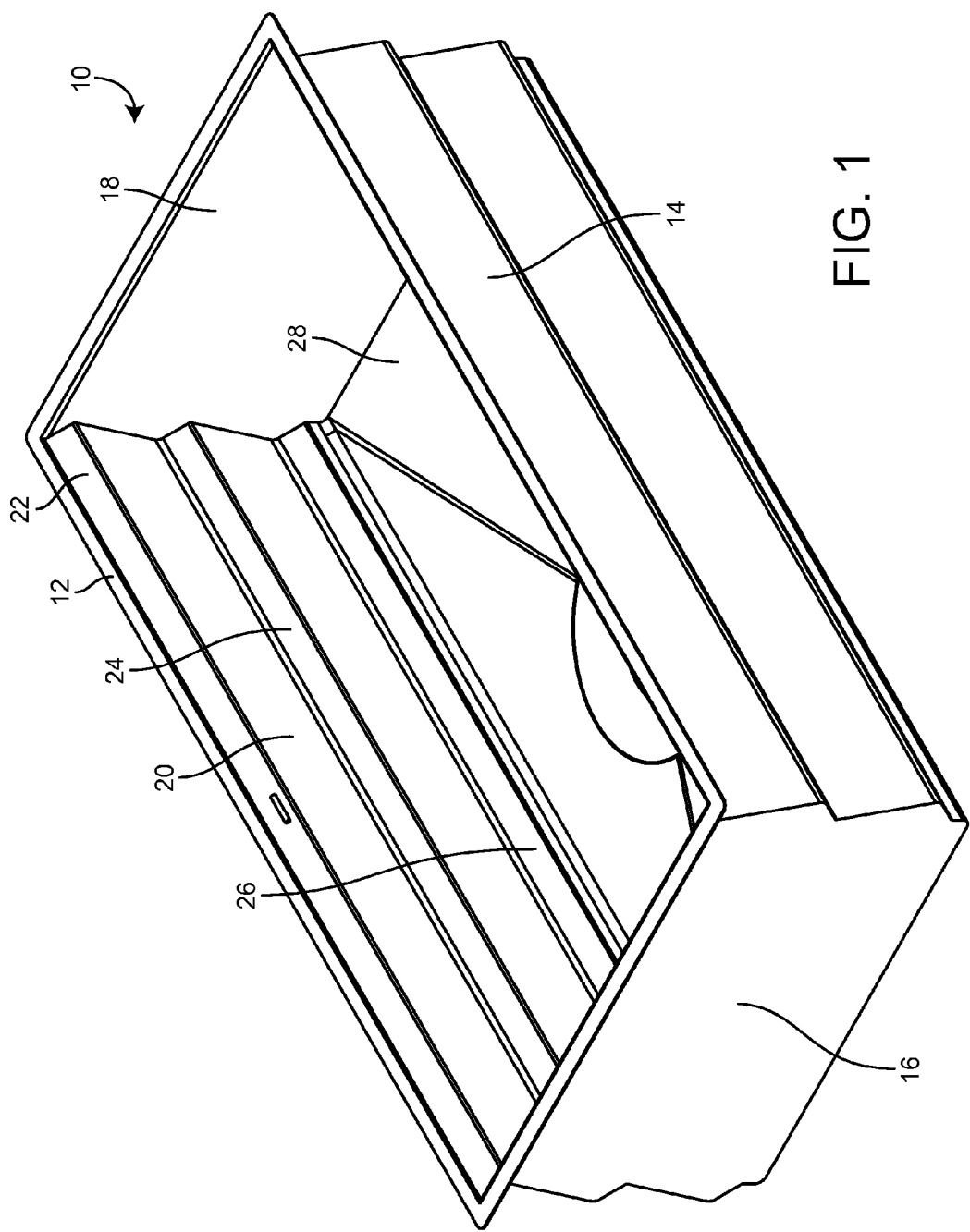
FIG. 1 is a perspective view of a sink according to an exemplary embodiment.
Figure 2:
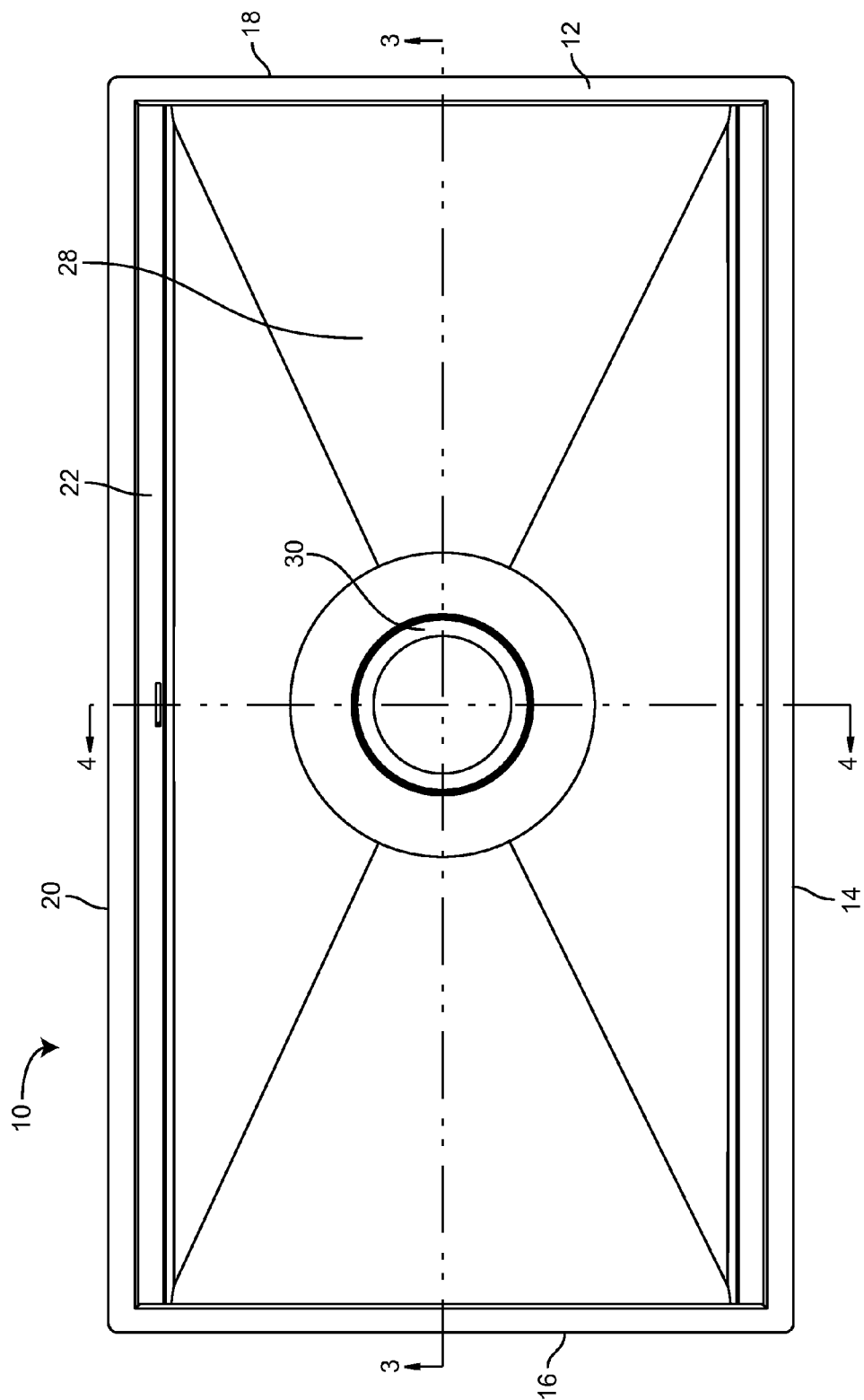
FIG. 2 is a top view of the sink of FIG. 1.
Figure 3:
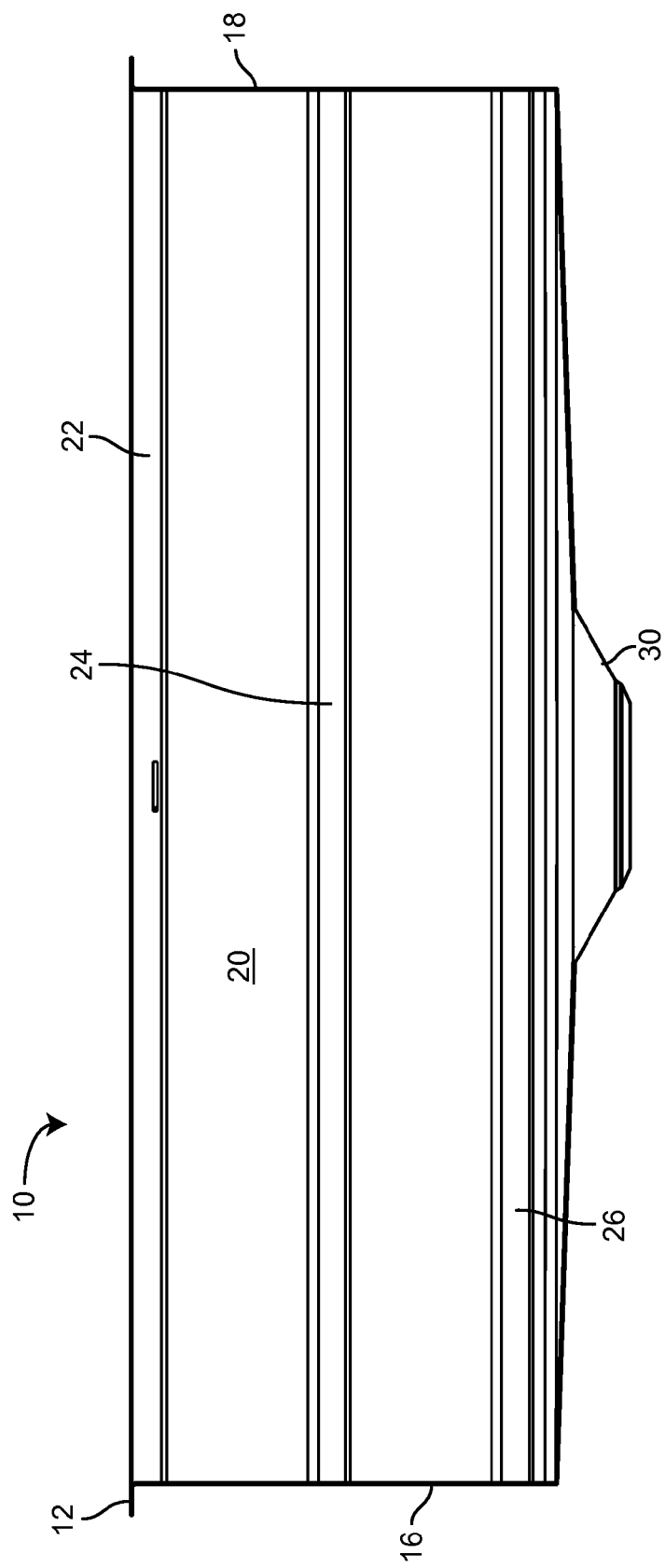
FIG. 3 is a cross-sectional view of the sink taken along line 3-3 in FIG. 2.

Referring to the FIGURES generally, various embodiments disclosed herein relate to a multi-function sink system. The multi-function sink system includes a sink basin configured to receive and/or support sink accessories or inserts for assisting a user with sink-related tasks, such as those associated with meal preparation and clean-up (e.g., washing and cutting produce, washing dishes and cookware, etc.). The sink accessories may be removably and slidably positioned (i.e., installed, mounted, fitted, nested, etc.) within the sink basin at more than one height, so that each task may be performed at an ergonomically appropriate height (i.e., a work zone). The multi-function sink system is also configured to support multiple sink accessories so that more than one task may be performed simultaneously. For example, a colander can be used to strain pasta while simultaneously using a cutting board to cut solids (e.g., vegetables, etc.) within the sink basin.

Referring to FIGS. 1-4, a sink basin 10 (e.g., sink, tub, etc.) for the multi-function sink system is shown according to an exemplary embodiment. In this embodiment, the sink basin 10 includes two side walls 16 and 18 and front and rear walls 14 and 20. The walls 14, 16, 18, and 20 are substantially vertically oriented (according to the orientation of FIG. 1), and extend upward from a bottom surface 28, with a lip 12 (i.e., ledge, rim, etc.) provided at the top of walls 14, 16, 18, and 20. The lip 12 is formed around an opening of the sink basin 10, providing an edge for mounting the sink basin 10 to a countertop or the like. In an exemplary embodiment, the sink basin 10 is made from stainless steel, but the sink basin 10 may be made from another rigid or semi-rigid material in other embodiments as may be suitable for the particular application of the sink basin 10.

In an exemplary embodiment, the sink basin 10 is sized so that the sink basin 10 may be used for temporary storage of food, dishes, or other items by placing the items within the sink basin 10 and on the bottom surface 28. The bottom surface 28 may also provide support for heavy scrubbing or utility cleaning of large objects (e.g., dishes, cookware, etc.). In the illustrated embodiment of FIGS. 1-4, the bottom surface 28 slants downward away from the bottom edges of walls 14, 16, 18, and 20 toward a drain 30. The sink basin 10 directs water along the sloped bottom surface 28 toward the drain 30. In an exemplary embodiment, the drain 30 has a substantially conical shape so that water or other liquid is collected into the drain 30 and forced out of the sink basin 10, although the size, shape, and configuration of the drain may differ according to other exemplary embodiments.

Figure 4:
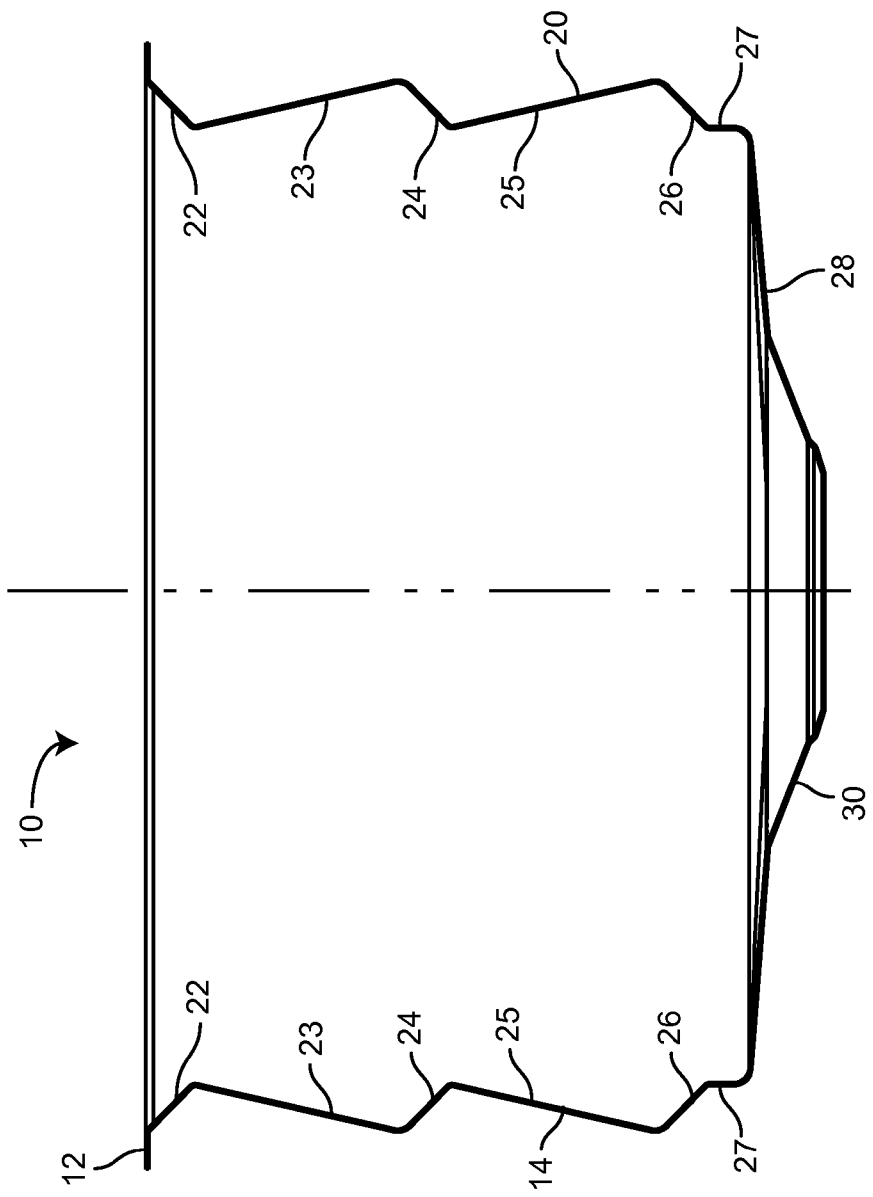
FIG. 4 is a cross-sectional view of the sink taken along line 4-4 in FIG. 2.
Figure 5:
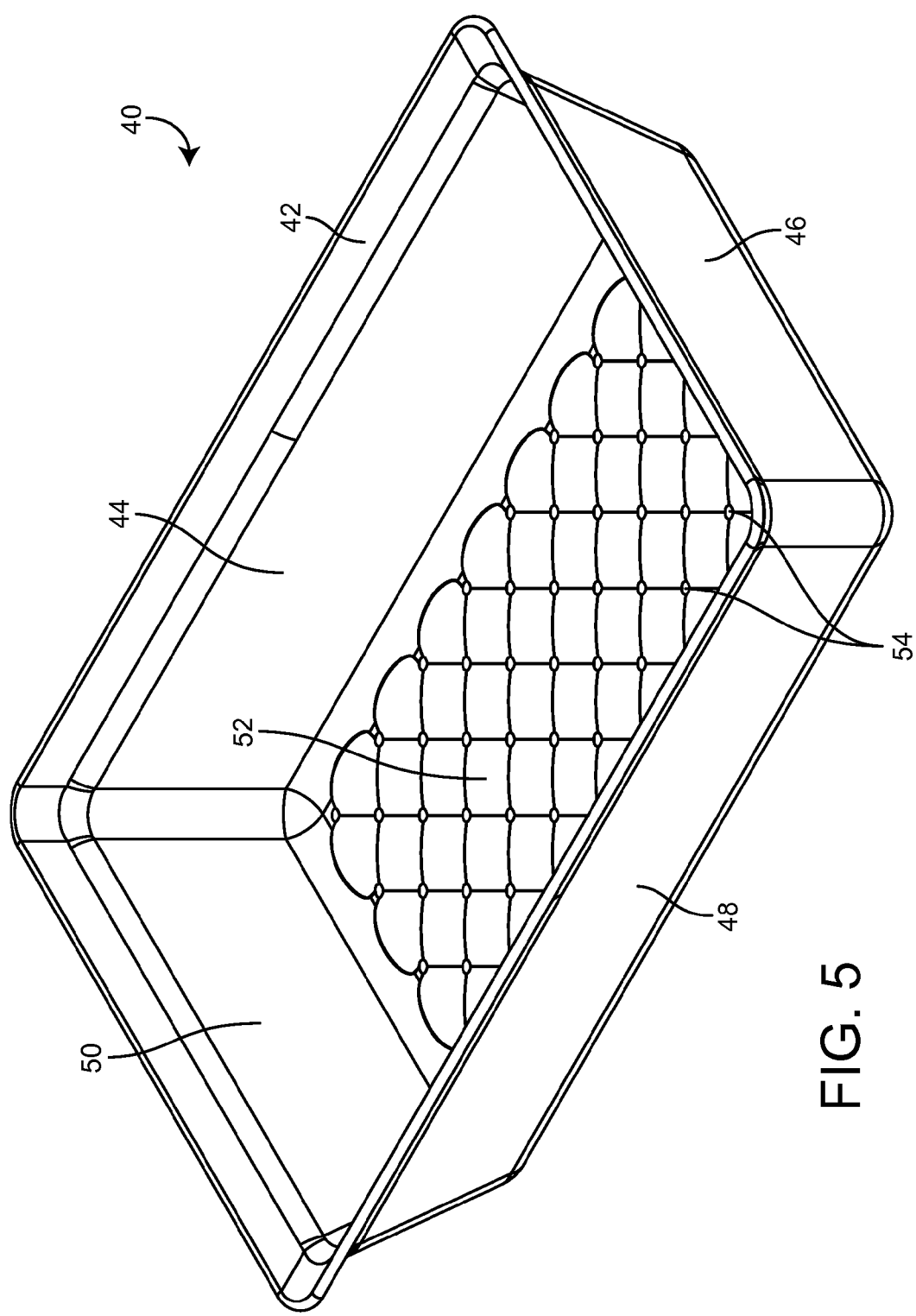
FIG. 5 is a perspective view of a colander for a sink according to an exemplary embodiment.
Figure 6:
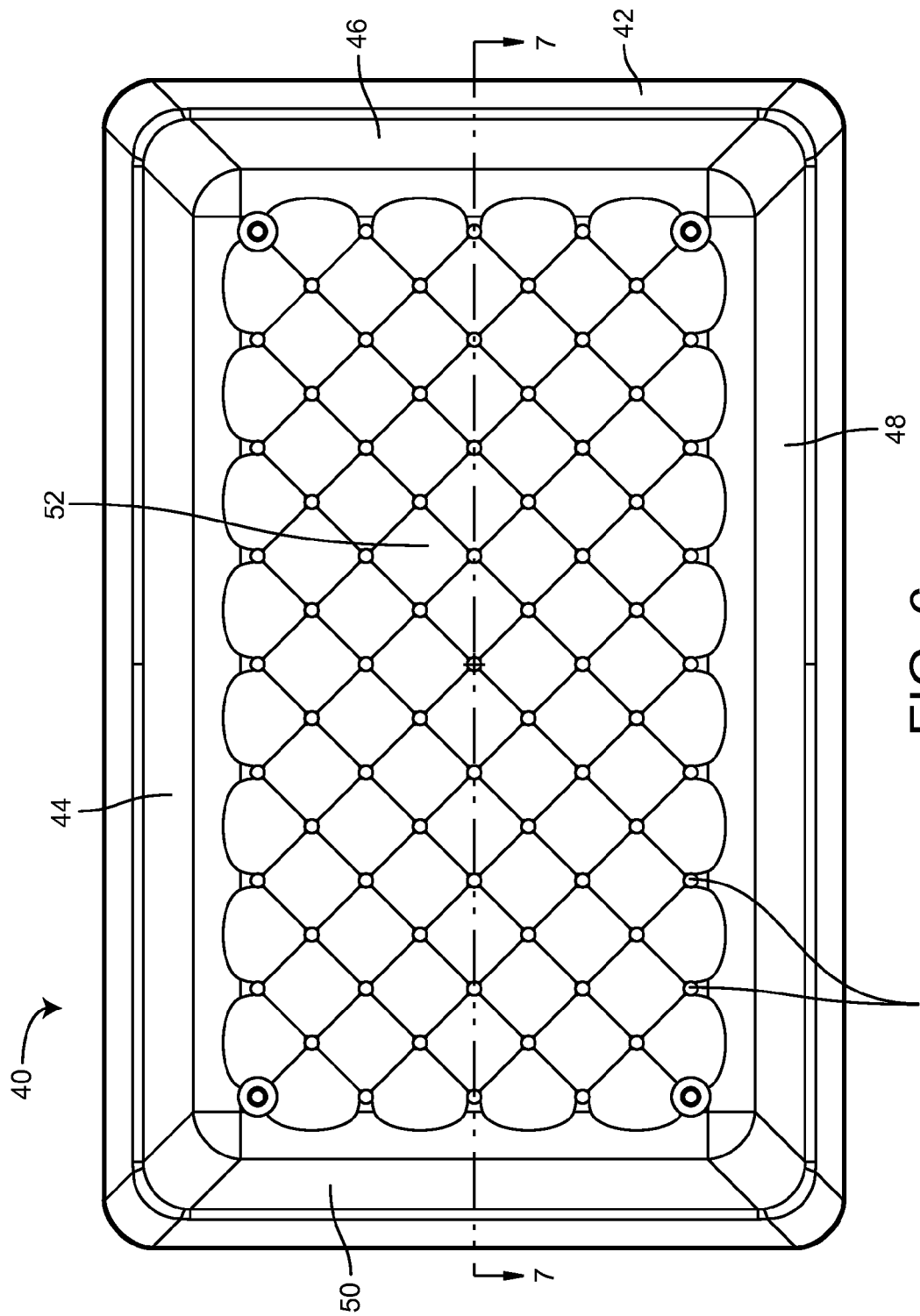
FIG. 6 is a top view of the colander of FIG. 5.

The walls 14 and 20 include sets of ledges (i.e., bevels, ledges, etc.) which are shown in the FIGS. 1-4 as ledges 22, 24, and 26 (matching ledges or ledges on the front and rear walls are denoted with the same reference numerals). In an exemplary embodiment, the ledges 22, 24, and 26 are located on the walls 14 and 20 at three fixed heights, with each of the walls 14 and 20 having step 22 formed at a first height, step 24 formed at a second height, and step 26 formed at a third height. The ledges 22, 24, and 26 of the wall 14 correspond with the height of the ledges 22, 24, and 26 of wall 20 such that the walls 14 and 20 mirror each other (i.e., the walls 14 and 20 are mirror images of each other). As shown in FIG. 4, the ledges 22, 24, and 26 are angled downward toward the center of the sink basin 10 on both walls 14 and 20, creating a ledge (i.e., support surface, etc.) for receiving (i.e., supporting) one or more sink accessories (e.g., colanders, cutting boards, drying racks, etc.) to assist with one or more tasks associated with the multi-function sink system (e.g., washing, cutting, drying, etc.).

In an exemplary embodiment, the sets of ledges 22, 24, and 26 may be positioned according to user-defined "work zones" (i.e., height ranges in which certain tasks are completed most efficiently). For instance, the set of ledges 26 may be positioned within the sink basin 10 at a height most suitable for performing heavy duty tasks (e.g., scrubbing, mixing, etc.). The ideal work zone (i.e., heavy duty task ideal work zone) for heavy duty tasks is typically approximately 4 to 10 inches below the elbow height of a user performing the task, or approximately 28 to 35 inches from the ground (i.e., from the surface on which the user is standing). In some embodiments, the sink basin 10 and the ledges 26 are positioned such that the height of the ledges 26 is within this ideal work zone for heavy duty tasks. Likewise, the ledges 24 may be positioned within the sink basin 10 at a height corresponding with the ideal work zone for performing light duty tasks (i.e., light duty task ideal work zone) such as peeling and cutting (i.e., approximately 2 to 4 inches below the elbow height of a user performing the task, and approximately 34 to 37 inches from the ground). Similarly, the ledges 22 may be positioned within the sink basin 10 at a height corresponding with the ideal work zone for performing precision tasks (i.e., precision task ideal work zone) such as sorting and staging (i.e., approximately 2 to 4 inches above the elbow height of a user performing the task, and approximately 37 to 43 inches from the ground).

In the illustrated embodiment of FIGS. 1-4, the sink basin 10 includes three sets of ledges 22, 24, and 26 configured to act as guides or ledges to support one or more sink accessories (i.e., inserts, supplements, attachments, etc.) for use with the multi-function sink system. The ledges 22, 24, and 26 may be positioned at three different heights or levels within the sink basin 10. In other embodiments, the sink basin 10 may include a greater or lesser number of ledges depending on the use or application of the particular multi-function sink system. In some embodiments, the sink basin 10 may include a single ledge or step for receiving one or more sink accessories.

The configuration of the ledges 22, 24, and 26 is shown more particularly in FIG. 4. The ledges 26 are positioned near the bottom surface 28 of the sink basin 10. In this position, the ledges 26 are at a lower height than ledges 22 or 24, and are thus at a lower height relative to a user of the sink system. In an exemplary embodiment, the ledges 26 are configured to support one or more sink accessories associated with heavy duty tasks (e.g., scrubbing, mixing, etc.). In some other embodiments, the ledges 26 are configured to support sink accessories for assisting with performing light duty or precision-oriented tasks, or for assisting with any other type of task typically associated with a sink, such as cooking tasks. In an exemplary embodiment, the ledges 26 are configured to support a platform 110 (shown in FIGS. 20-22) in order to cover the drain 30, such as to conceal the drain 30 from view of the user of the sink.

As shown in FIG. 4, each of the walls 14 and 20 include a first transition 27 extending upright (i.e., vertically, etc.) from the bottom surface 28 to the ledge 26. The ledge 26 extends upward and away from the center of the drain 30 and terminates at a second transition 25. The ledge 26 is oriented (i.e., angled, tapered, etc.) at an angle less than 90 degrees from horizontal. The second transition 25 extends upward from the ledge 26 and inward toward the center of drain 30 (represented by the dashed center line). The second transition terminates at the ledge 24. The ledge 24 extends generally upward and away from the center of the drain 30 at an angle substantially the same as the angle of ledge 26, such that ledge 24 is parallel to ledge 26. The ledge 24 terminates at a third transition 23. The third transition 23 extends upward from the ledge 24 and inward toward the center of drain 30. In the embodiment shown, the third transition 23 is substantially parallel to the second transition 25. The third transition 23 terminates at the ledge 22. The ledge 22 extends upward and away from the center of drain 30 at an angle substantially the same as ledges 24 and 26, such that the ledge 22 is parallel to the ledges 24 and 26. The ledge 22 terminates at the lip 12.

The ledges 22 and 24 are positioned above the ledges 26 within the sink basin 10, and are also configured to support various sink accessories. Sink accessories having a deeper bottom may be positioned onto ledges 22 and/or 24 more easily than onto ledges 26 because there is more space between ledges 22 and 24 and the bottom surface 28 of the sink basin 10. The ledges 24, for instance, are positioned directly above the ledges 26 and near the center of each of walls 14 and 20 within the sink basin 10. In some embodiments, the ledges 24 are utilized to support one or more sink accessories associated with light duty tasks because of the position of the ledges 24 near the center of the sink basin 10 and closer to the ideal work zone for light duty tasks. However, the ledges 24 may also be configured to support sink accessories for assisting with other cooking or sink-related tasks, such as heavy duty tasks or precision tasks. In the illustrated embodiment of FIGS. 1-4, the ledges 24 are positioned a distance above the bottom surface 28 such that the ledges 24 may support a sink accessory having a depth, such as a wash bin 90 (shown in FIGS. 16-19) or a colander 40 (shown in FIGS. 5-8).

The ledges 22 are positioned closest to the lip 12 of the sink basin 10, and at a height above ledges 24 and 26. In an exemplary embodiment, the ledges 22 are configured to support one or more sink accessories associated with precision tasks (e.g., sorting, staging, etc.) in order to raise the height of the work area for those precision tasks to a height closer to the user (and within the ideal work zone for precision tasks). In other embodiments, the ledges 22 are configured to support one or more sink accessories associated with light duty and heavy duty tasks. In some embodiments, the ledges 22 are positioned a distance above the bottom surface 28 to accommodate a sink accessory having a depth when the sink accessory is positioned onto ledges 22.

Turning now to several examples of accessories that may be used in conjunction with a sink such as that disclosed herein, and referring specifically to FIGS. 5-8, a colander 40 for the multi-function sink system is shown according to an exemplary embodiment. In this embodiment, the colander 40 includes two side walls 46 and 50 and front and rear walls 44 and 48. The walls 44, 46, 48, and 50 are substantially vertically oriented (according to the orientation of FIG. 5). The walls 44, 46, 48, and 50 extend from a bottom surface 52, with a border 42 (e.g., edge, ridge, boundary, collar, etc.) provided at the top of walls 44, 46, 48, and 50. In an exemplary embodiment, the bottom surface 52 of the colander 40 includes holes 54 (i.e., apertures, perforations, etc.) that are configured to allow liquid to drain through the bottom surface 52 while retaining any solids within the colander 40. The colander 40 may also be used for draining water from food such as pasta or rice, for drying dishes or cookware, or for another purpose suitable for the particular application of the colander 40 and the multi-function sink system. The walls 44, 46, 48, and 50 slant (i.e., taper, etc.) inward toward the bottom surface 52 from the border 42, so that any liquid within the colander 40 is channeled toward the bottom surface 52 to be drained from the colander 40. The colander 40 may be made from plastic in some embodiments, or may be made from another material suitable for the purposes of the colander 40 and the multi-function sink system in other embodiments.

Figure 23:
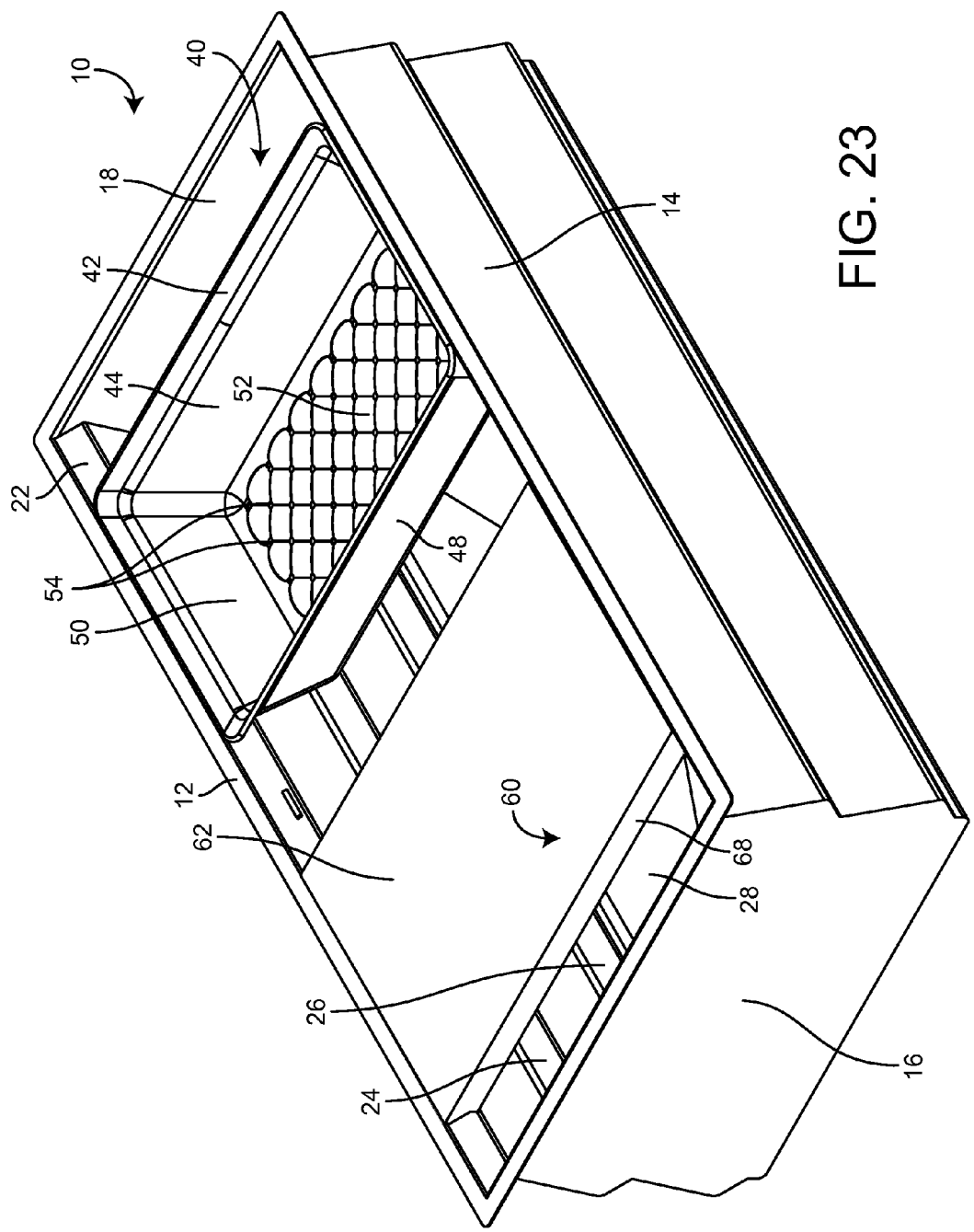
FIG. 23 is a perspective view of the colander of FIG. 5 and the cutting board of FIG. 9 positioned within the sink basin of FIG. 1 according to an exemplary embodiment.

The colander 40 is configured to fit within the sink basin 10 to assist with tasks associated with the multi-function sink system (see FIG. 23). The border 42 of the colander 40 is configured to be received or supported by the ledges 22, 24, and/or 26. In an exemplary embodiment, the border 42 is slanted or angled to compliment the angle of ledges 22, 24, and 26, such that the border 42 makes sufficient contact with the ledges 22, 24, or 26 to be held above the bottom surface 28 by the ledges 22, 24, or 26. The colander 40 is positioned within the sink basin 10 such that the wall 50 is substantially adjacent to the wall 20 or 14 and the wall 46 is substantially adjacent to the opposite wall 20 or 14 (see FIG. 23). In an exemplary embodiment, the length of the colander 40 (i.e., the distance between wall 50 and wall 46) is approximately equal to the width of the sink basin 10 (i.e., the distance between wall 14 and the wall 20), so that the colander 40 fits within the sink basin 10 above the bottom surface 28. In one embodiment, the length of the sink basin 10 is at least three times greater than the width of the colander 40, such that the sink basin 10 may accommodate up to three substantially adjacent colanders 40 (or other types of sink accessories such as those described herein) on a single set of ledges 22, 24, or 26. In other embodiments, the sink basin 10 and colander 40 may be sized such that the sink basin 10 is able to accommodate a greater or lesser number of colanders 40 on each set of ledges 22, 24, or 26. In an exemplary embodiment, the colander 40 and sink basin 10 are sized and shaped such that the bottom surface 52 of the colander 40 rests above the bottom surface 28 of the sink basin 10 when the colander 40 is positioned onto ledges 22, 24, or 26 within the sink basin 10. However, the colander 40 and sink basin 10 may also be configured such that the bottom surface 52 rests on the bottom surface 28 when the colander 40 is positioned within the sink basin 10, such as when the colander 40 is supported by the bottom ledges 26. In an exemplary embodiment, the colander 40 is sized, shaped, and/or otherwise configured to nest within wash bin 90 (shown in FIGS. 16-19), such as to limit storage space necessary for the colander 40 and the wash bin 90.

In an exemplary embodiment, the colander 40 is made from a talc-filled polypropylene material. In this embodiment, polypropylene forms the exposed outer surface of the colander 40, which may allow a user of the multi-function sink system to slide the colander 40 laterally within the sink basin 10 and along the ledges 22, 24, or 26. The unexposed inner portion of the colander 40 is at least partially made from talc in this embodiment, which is intended to substantially prevent the colander 40 from floating when the sink basin 10 is filled with water or another liquid. In other embodiments, the colander 40 may be made from other material(s) having similar characteristics, or another material(s) suitable for the particular application or purpose of the colander 40 and/or the multi-function sink system in those embodiments.

Figure 11:
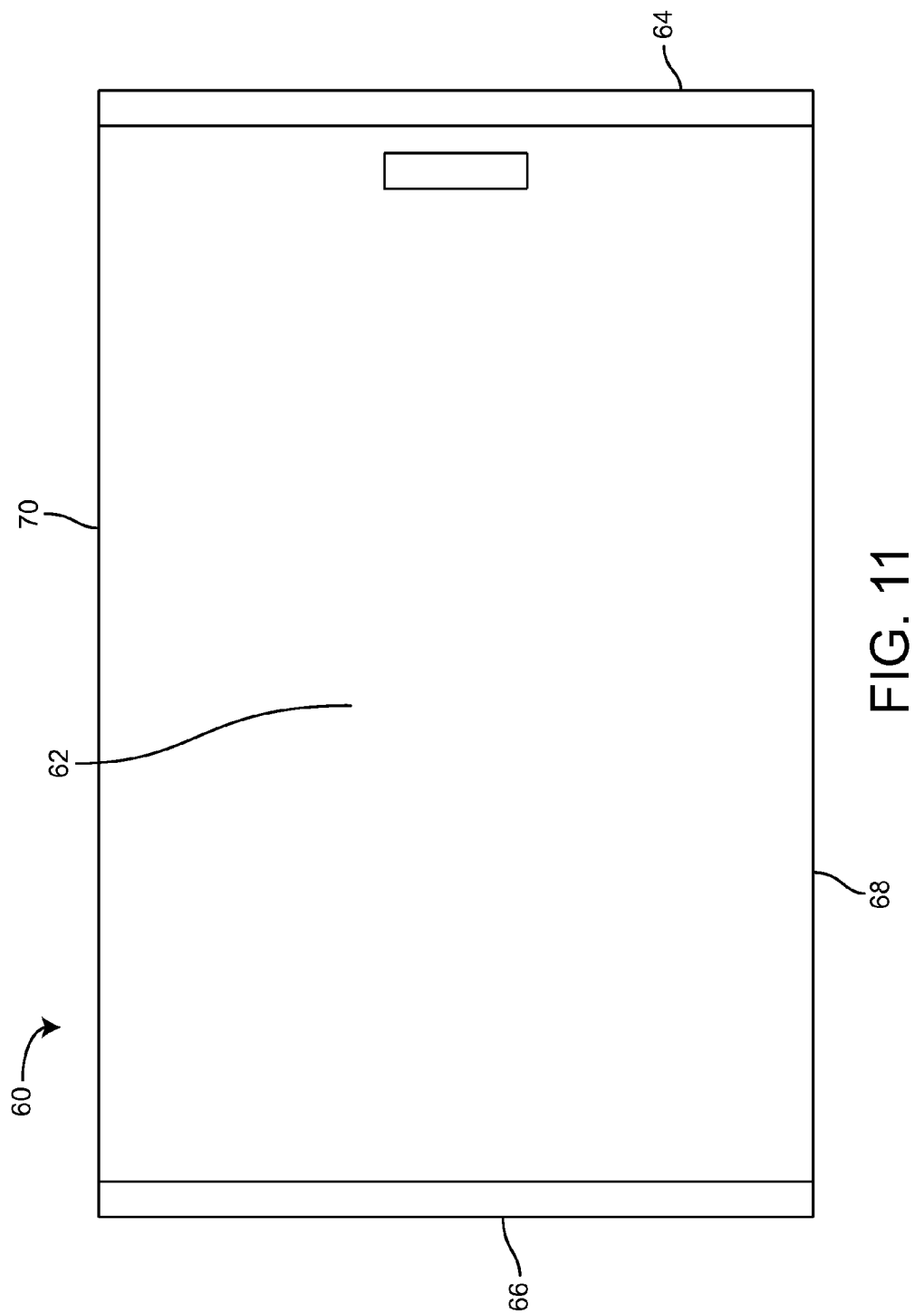
FIG. 11 is a top view of the cutting board of FIG. 9.
Figure 12:
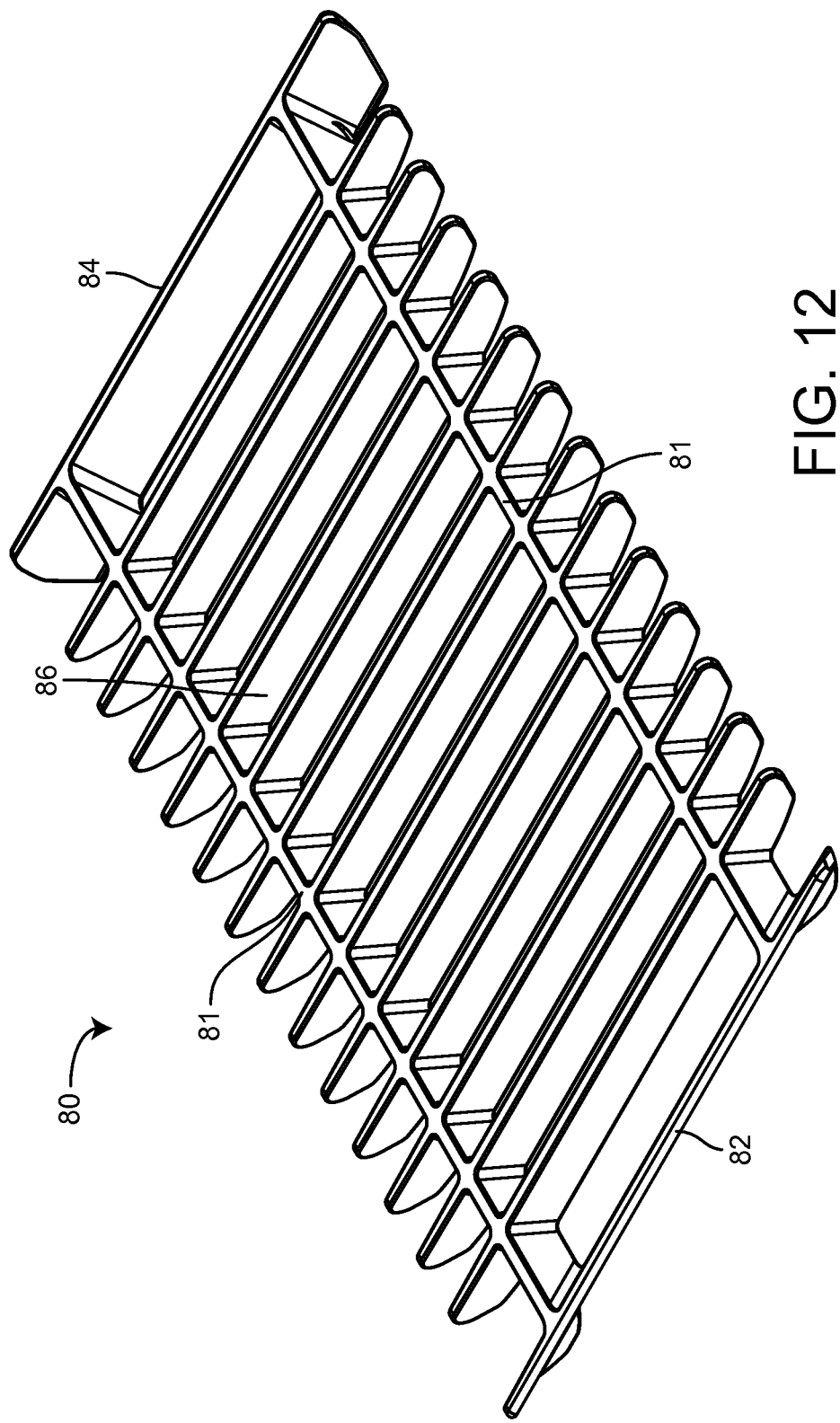
FIG. 12 is a top perspective view of a grate according to an exemplary embodiment.
Figure 16:
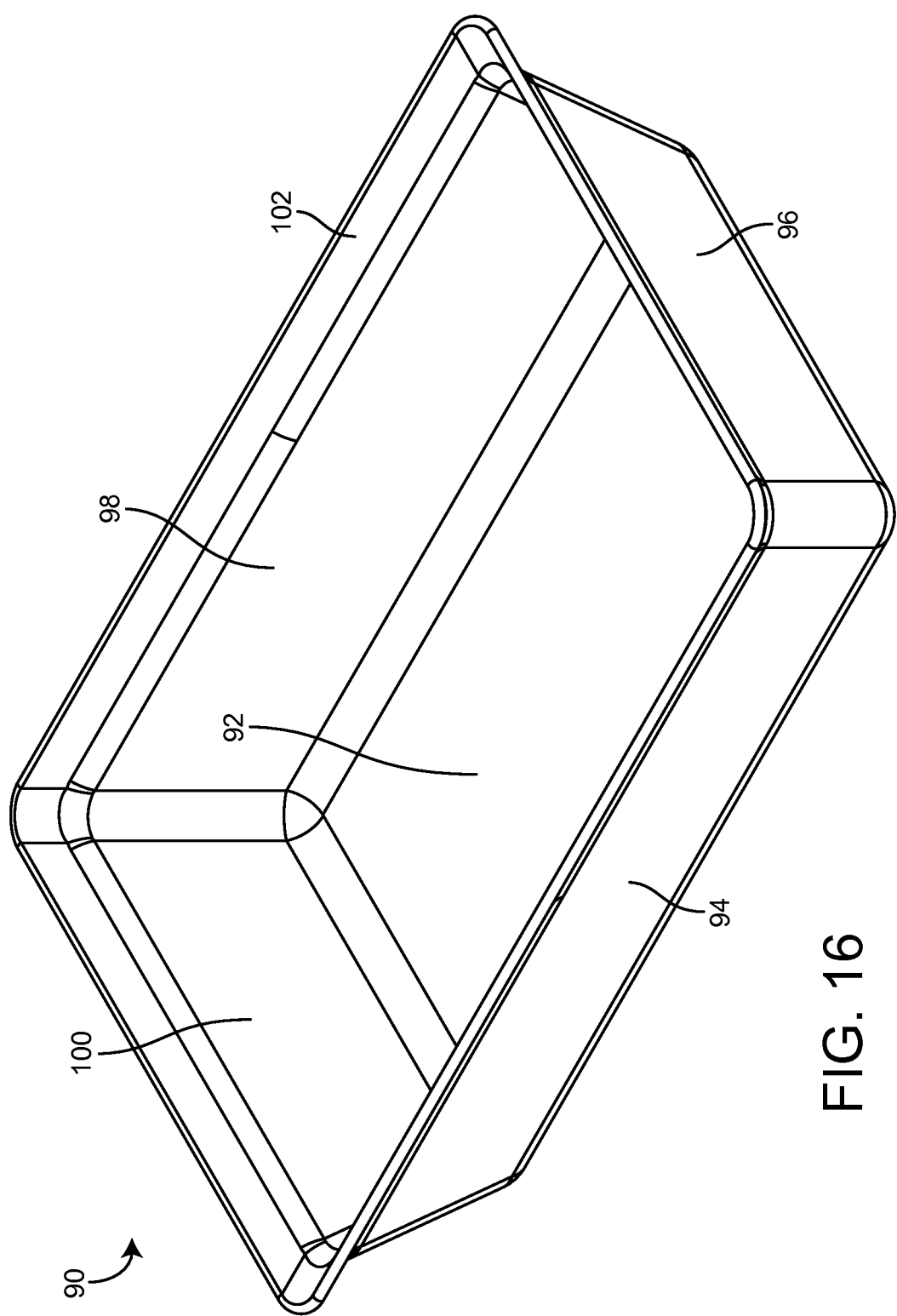
FIG. 16 is a perspective view of a wash bin according to an exemplary embodiment.
Figure 17:
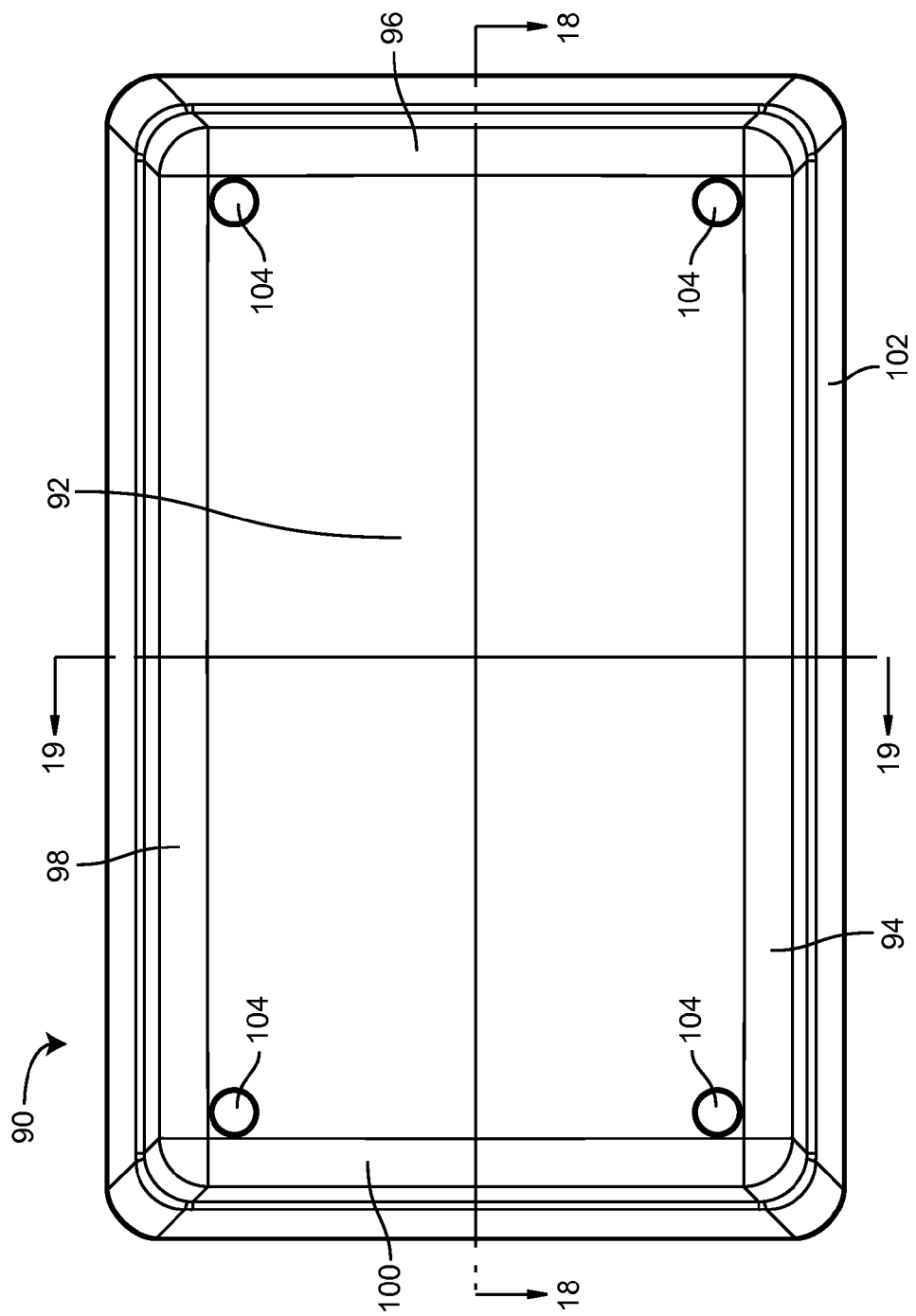
FIG. 17 is a top view of the wash bin of FIG. 16.
Figure 18:
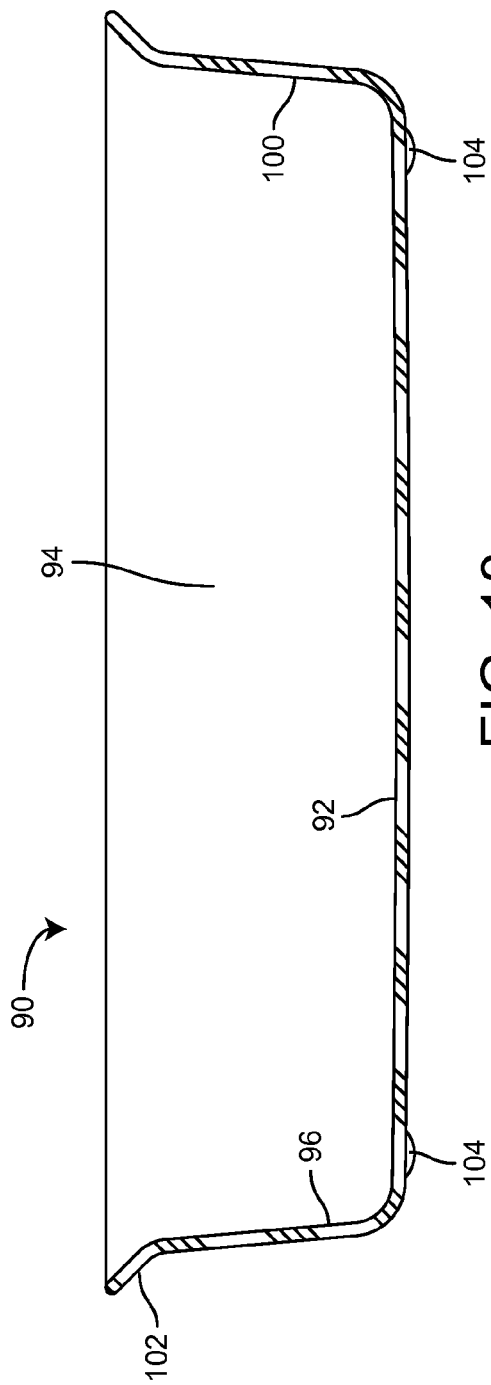
FIG. 18 is a cross-sectional view of the wash bin taken along line 18-18 in FIG. 17.
Figure 19:
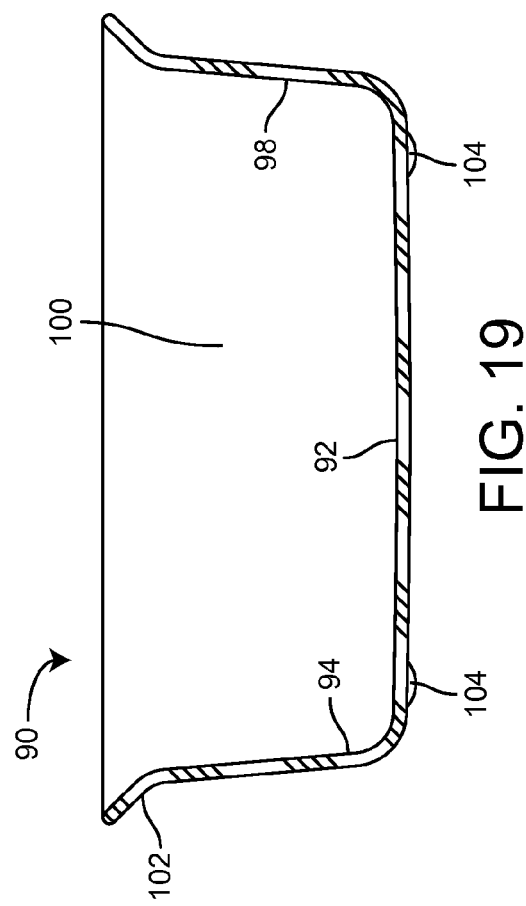
FIG. 19 is a cross-sectional view of the wash bin taken along line 19-19 in FIG. 17.

Referring now to FIGS. 9-11, a cutting board 60 for the multi-function sink system is shown according to an exemplary embodiment. In this embodiment, the cutting board 60 has a substantially rectangular shape, having sides 68 and 70 connected perpendicularly to sides 64 and 66. The four sides 64, 66, 68, and 70 meet at a generally planar cutting surface 62, which forms the top surface of the cutting board 60 (according to other exemplary embodiments, the cutting board may include notches, grooves, apertures, or other features formed therein to provide any desired functionality). In an exemplary embodiment, the cutting surface 62 is made at least partially from a bamboo material, but in other embodiments the cutting surface 62 may be made from another material suitable for providing a cutting surface, such as wood or plastic. The remainder of the cutting board 60 may be made from the same material as the cutting surface 62, or may be made from another material. In an exemplary embodiment, the cutting board 60 is configured such that a user is able to slide the cutting board 60 laterally along the ledges 22, 24, or 26 when the cutting board 60 is positioned within the sink basin 10. However, in some embodiments the cutting board 60 may be made at least partially from or include a non-slip material, preventing unintended movement of the cutting board 60 relative to the ledges 22, 24, or 26 when the cutting board 60 is positioned within the sink basin 10 (i.e., when received or supported by the ledges 22, 24, or 26).

Figure 25:
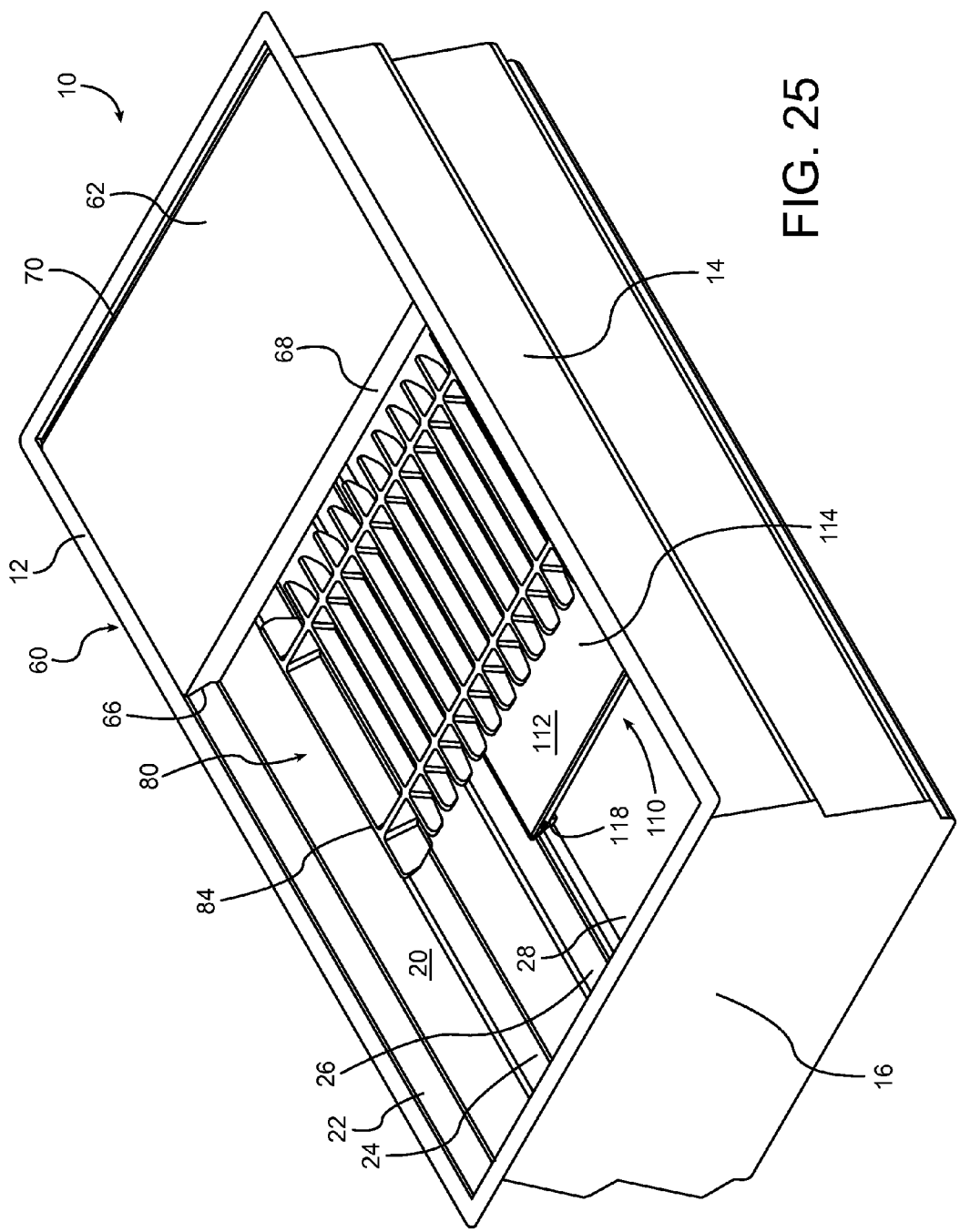
FIG. 25 is a perspective view of the cutting board of FIG. 9, the grate of FIG. 12, and the platform of FIG. 20 positioned within the sink basin of FIG. 1 according to an exemplary embodiment.

In an exemplary embodiment, the cutting board 60 is configured to be received or supported by the ledges 22, 24, and/or 26 (see FIGS. 23 and 25). The sides 64 and 66 of the cutting board 60 may be sized and shaped to be supported by the ledges 22, 24, and/or 26, mounting or nesting the cutting board 60 within the sink basin 10 for assisting with sink-related tasks (e.g., cutting, peeling, sorting, etc.). In the illustrated embodiment of FIGS. 9-11, the sides 64 and 66 are slanted or angled to compliment (i.e., approximate, etc.) the angle of ledges 22, 24, and 26. The slanted sides 64 and 66 are configured to provide a sufficient contact surface for mating the sides 64 and 66 with ledges 22, 24, or 26, thereby supporting (i.e., holding, etc.) the cutting board 60 above the bottom surface 28 of the sink basin 10. The cutting board 60 is configured to be supported by any of the ledges 22, 24, and/or 26, and may be positioned within the sink basin 10 according to the height of the user and/or the type of task being performed. For instance, a user may mount the cutting board 60 within the top set of ledges 22 in order to position the cutting board 60 nearest to the user for completing precision tasks. The cutting board 60 is configured such that the sides 64 and 66 are positioned adjacent to the walls 14 and 20 when the cutting board 60 is positioned within the sink basin 10. In an exemplary embodiment, the length of the cutting board 60 (i.e., the length of sides 68 and 70) is approximately equal to the width of the sink basin 10 (i.e., the length of walls 16 and 18), such that the cutting board 60 fits snugly within the sink basin 10 and the sides 68 and 70 of the cutting board 60 extend from wall 14 to wall 20. In one embodiment, the length of the sink basin 10 (i.e., the length of walls 14 and 20) is at least three times greater than the width of the cutting board 60 (i.e., the length of sides 64 and 66), such that the sink basin 10 may accommodate up to three substantially adjacent cutting boards 60 (or other types of sink accessories such as those described herein) on a single set of ledges 22, 24, or 26. In other embodiments, the sink basin 10 and cutting board 60 may be sized such that the sink basin 10 accommodates a greater or lesser number of cutting boards 60 on each set of ledges 22, 24, or 26.

Referring now to FIGS. 12-15, a grate 80 (i.e., drying rack) for the multi-function sink system is shown according to an exemplary embodiment. In this embodiment, the grate 80 is sized and shaped to fit within the sink basin 10 in order to assist with tasks related to the multi-function sink system (see FIGS. 24 and 25). In the illustrated embodiment of FIGS. 12-15, the grate 80 is "grated" (e.g., waffled, grill-marked, etc.), having openings 86 (i.e., slots, etc.) positioned within the grate 80 for allowing liquid and small solids to fall through the grate 80 and into the sink basin 10. In some embodiments, the grate 80 may be used as a drying rack for dishes, with the openings 86 providing individual holders for each dish. The grate 80 includes two sides 82 and 84 configured to be received or supported by the ledges 22, 24, and/or 26, mounting or nesting the grate 80 within the sink basin 10. In the illustrated embodiment of FIGS. 12-15, the sides 82 and 84 are slanted or angled to compliment (i.e., approximate, etc.) the angle of ledges 22, 24, and 26. The slanted sides 82 and 84 are configured to provide a sufficient contact surface for mating with ledges 22, 24, or 26, thereby supporting (i.e., holding, etc.) the grate 80 above the bottom surface 28 of the sink basin 10. The grate 80 also includes two ribs 81 extending from side 82 to side 84, spanning the sink basin 10 for providing structural support to the grate 80 when the grate 80 is positioned within the sink basin 10. In other embodiments, the grate 80 may include a greater or lesser number of ribs 81. Further, as shown in FIG. 15, the grate 80 may include rests 88 for mating with the ledges 22, 24, and/or 26.

In an exemplary embodiment, the grate 80 is made from a talc-filled polypropylene material. In this embodiment, polypropylene forms the exposed outer surface of the grate 80, which may allow a user of the multi-function sink system to slide the grate 80 laterally within the sink basin 10 and along the ledges 22, 24, or 26. The unexposed inner portion of the grate 80 is at least partially made from talc in this embodiment, which is intended to substantially prevent the grate 80 from floating when the sink basin 10 is filled with water or another liquid. The grate 80 may also include two stainless steel rails inserted within the ribs 81 to provide additional support for the grate 80. In other embodiments, the grate 80 may be made from other material(s) having similar characteristics, or another material(s) suitable for the particular application or purpose of the grate 80 and/or the multi-function sink system in those embodiments.

The grate 80 fits within the sink basin 10 such that side 82 is positioned adjacent to side 14 or 20 of the sink basin 10, and side 84 is positioned adjacent to the opposite side 14 or 20 of the sink basin 10. In an exemplary embodiment, the length of the grate 80 from side 82 to side 84 is approximately equal to the width of the sink basin 10 from wall 14 to wall 20 (i.e., the length of wall 18 or 16), such that the grate 80 fits snugly within the sink basin 10, extending from wall 14 to wall 20. Each set of ledges 22, 24, and 26 is configured to support more than one grate 80 at any one time. In one embodiment, the length of the sink basin 10 is at least three times greater than the width of the grate 80, such that the sink basin 10 may accommodate up to three substantially adjacent grates 80 (or other types of sink accessories such as those described herein) on a single set of ledges 22, 24, or 26. In this embodiment, up to three grates 80 may be positioned within the sink basin 10 on a single set of ledges 22, 24, or 26, perhaps providing a drying rack extending the length of the sink basin 10. In other embodiments, the sink basin 10 and grate 80 are sized such that the sink basin 10 may accommodate a greater or lesser number of cutting boards 60 on each set of ledges 22, 24, or 26. In an exemplary embodiment, the colander 40 is sized, shaped, and/or otherwise configured to nest within wash bin 90 (shown in FIGS. 16-19), such as to limit storage space necessary for the colander 40 and the wash bin 90. The grate may also sit on top of the wash bin and/or colander for easy storage.

Referring now to FIGS. 16-19, a wash bin 90 for the multi-function sink system is shown according to an exemplary embodiment. In this embodiment, the wash bin 90 includes walls 96 and 100 and front and rear walls 94 and 98. The walls 94, 96, 98, and 100 are substantially vertically oriented (according to the orientation of FIG. 16). The walls 94, 96, 98, and 100 extend from a bottom surface 92, with a border 102 (e.g., rim, edge, ridge, boundary, etc.) provided or located at the top of walls 94, 96, 98, and 100. The walls 94, 96, 98, and 100 slant (i.e., taper, etc.) inward from the border 102 toward the bottom surface 92, such that any objects or liquid are funneled toward the bottom surface 92 and held within the wash bin 90. In an exemplary embodiment, the wash bin 90 includes four (4) feet or rests 104 located on the bottom of the wash bin 90. The rests 104 are configured to contact a resting surface (e.g., bottom surface 28, a countertop surface, etc.) to hold the bottom surface 92 of the wash bin 90 above the resting surface. In an exemplary embodiment, the rests 104 are made from a durable rubber material, but may be made from another material in other embodiments.

Figure 24:
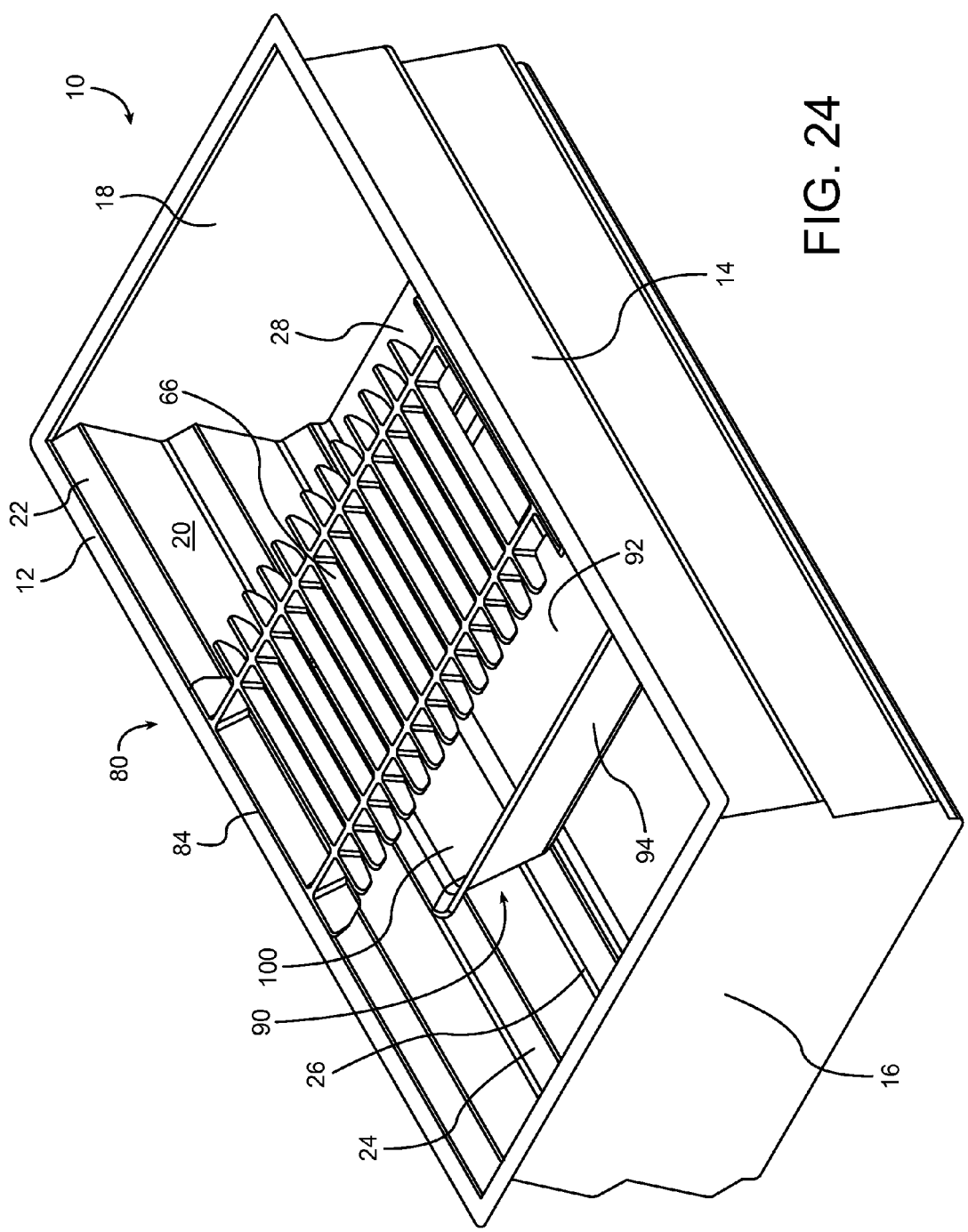
FIG. 24 is a perspective view of the grate of FIG. 12 and the wash bin of FIG. 16 positioned within the sink basin of FIG. 1 according to an exemplary embodiment.

The border 102 is configured to be received or supported by the ledges 22, 24, and/or 26, so that the wash bin 90 is positioned within the sink basin 10 (see FIG. 24). In the illustrated embodiment of FIGS. 16-19, the border 102 is slanted or angled to compliment (i.e., approximate, etc.) the angle of ledges 22, 24, and 26. The slanted border 102 is intended to provide a sufficient contact surface for mating with ledges 22, 24, or 26, holding the wash bin 90 above the bottom surface 28 of the sink basin 10. When nested within the sink basin 10, the wall 96 is positioned adjacent to one of the walls 14 or 20, and the wall 100 is positioned adjacent to the opposite wall 14 or 20. In an exemplary embodiment, the length of the wash bin 90 (i.e., the length of side 96 or 100) is approximately equal to the width of the sink basin 10 (i.e., the length of side 16 or 18), such that the wash bin 90 fits snugly within the sink basin 10 and the walls 94 and 98 of the wash bin 90 extend from wall 14 to wall 20 of sink basin 10. In one embodiment, the length of the sink basin 10 is at least three times greater than the width of the wash bin 90, such that the sink basin 10 may accommodate up to three substantially adjacent wash bins 90 (or other types of sink accessories such as those described herein) on a single set of ledges 22, 24, or 26. In other embodiments, the sink basin 10 and wash bin 90 may be sized such that the sink basin 10 may accommodate a greater or lesser number of wash bins 90 on each set of ledges 22, 24, or 26.

The wash bin 90 is configured to assist a user with one or more tasks related to the multi-function sink system. For instance, the wash bin 90 may be used to collect dirty dishes or cookware, to collect food products in advance of preparation, or for another purpose suitable for the configuration of the wash bin 90. In some embodiments, more than one wash bin 90 may be placed within the sink basin 10 and/or on a single set of ledges 22, 24, and/or 26. In some other embodiments, the wash bin 90 may be placed within the sink basin 10 with another sink accessory in order to perform one or more functions of the multi-function sink system. In some embodiments, the border 102 of the wash bin 90 may be at least partially made from a non-slip material, substantially preventing unintended movement of the wash bin 90 within the sink basin 10 (relative to the ledges 22, 24, and/or 26) when the wash bin 90 is positioned within the sink basin 10.

In an exemplary embodiment, the wash bin 90 is made from a talc-filled polypropylene material. In this embodiment, polypropylene forms the exposed outer surface of the wash bin 90, which may allow a user of the multi-function sink system to slide the wash bin 90 laterally within the sink basin 10 and along the ledges 22, 24, or 26. The unexposed inner portion of the wash bin 90 is at least partially made from talc in this embodiment, which is intended to substantially prevent the wash bin 90 from floating when the sink basin 10 is filled with water or another liquid. In other embodiments, the wash bin 90 may be made from other material(s) having similar characteristics, or another material(s) suitable for the particular application or purpose of the wash bin 90 and/or the multi-function sink system in those embodiments.

Figure 20:
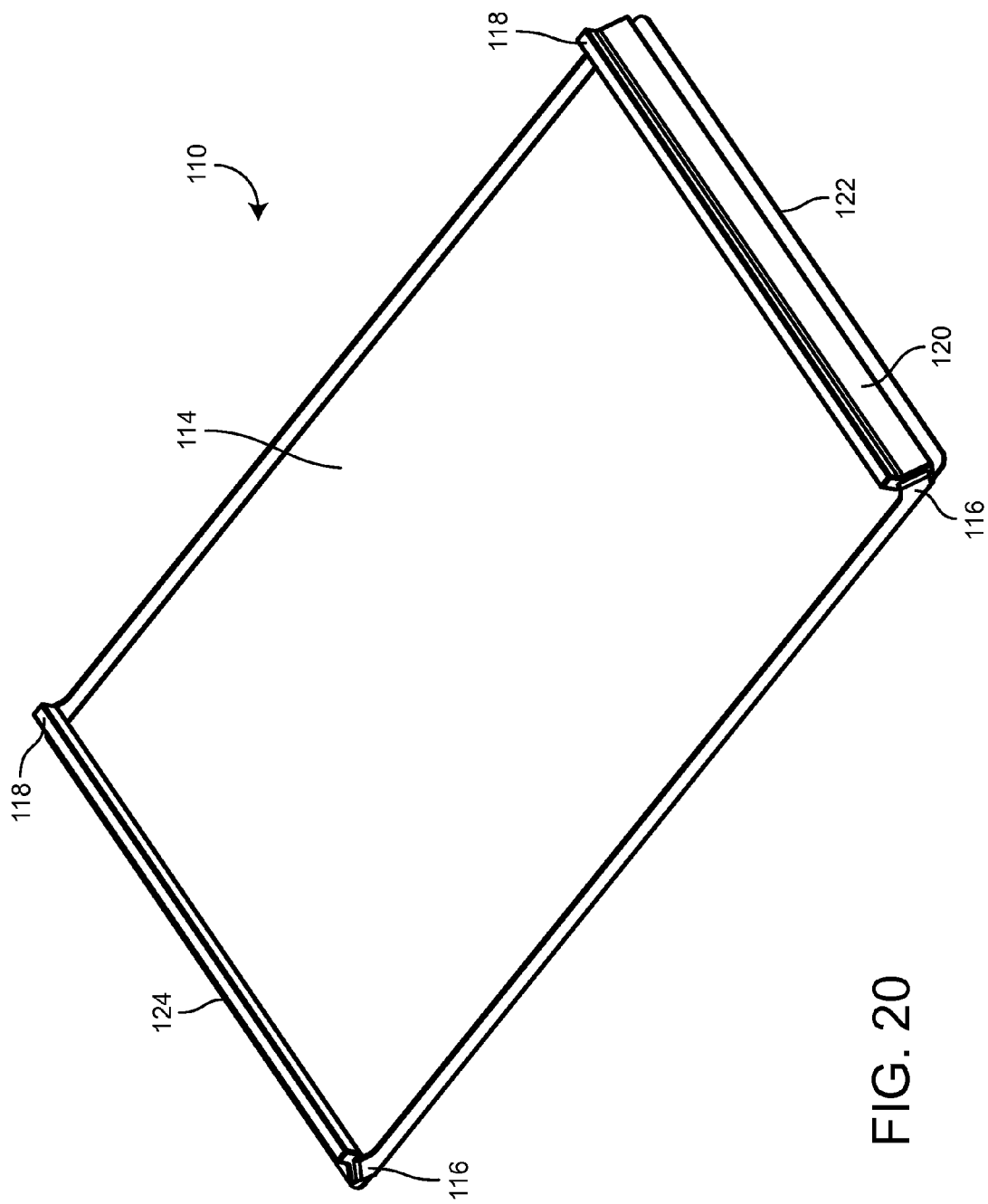
FIG. 20 is a perspective view of a platform according to an exemplary embodiment.
Figure 21:
FIG. 21 is a side view of the platform of FIG. 20.
Figure 22:
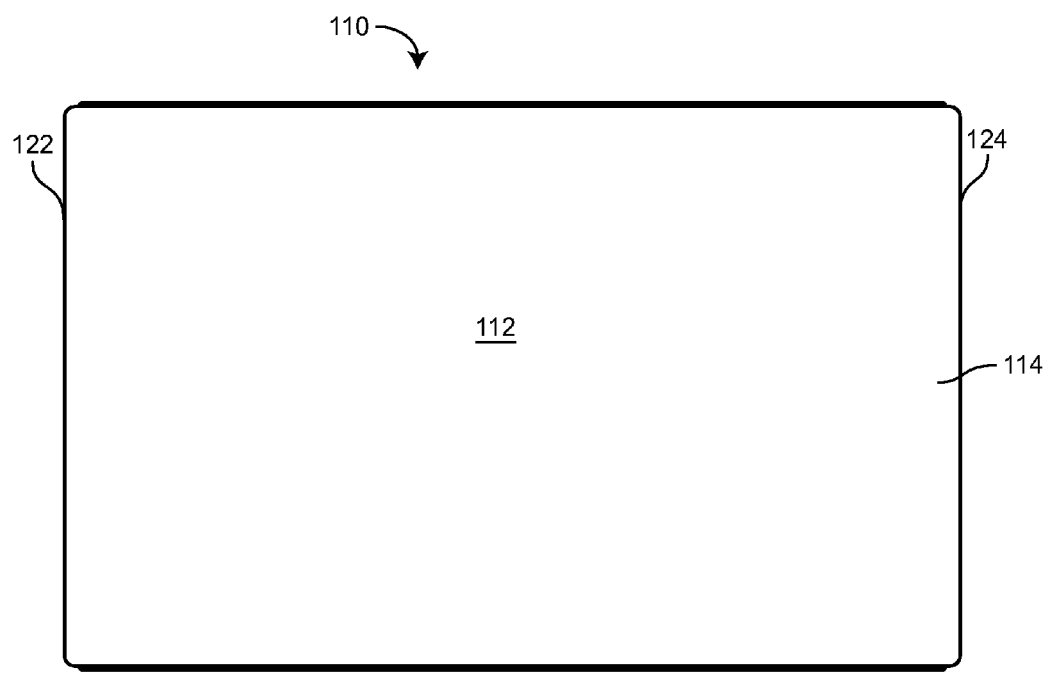
FIG. 22 is a top view of the platform of FIG. 20.

Referring now to FIGS. 20-22, a platform 110 (i.e., work surface, staging area, etc.) for the multi-function sink system is shown according to an exemplary embodiment. In this embodiment, the platform 110 includes a generally planar panel 114 (i.e., panel, member, etc.) for covering the drain 30 of the sink basin 10, and rails 118 (i.e., contact rails, ridges, etc.) on each side of the panel 114 for positioning the platform 110 within the sink basin 10 (see FIG. 25). The panel 114 is substantially rectangular in this embodiment, but may have another shape suitable for covering the drain 30 in another embodiment. In an exemplary embodiment, the panel 114 is made from a heavy-duty material intended to sustain forces from dishes, cookware, and other kitchen items, such as a stainless steel with a polished finish. However, in other embodiments the panel 114 may be made from another material as may be suitable for the particular application of the panel 114 and/or the platform 110. The platform 110 is intended to block the drain 30, such as to conceal the drain from the view of the user of the sink. The platform 110 also includes a top surface 112 for providing a sanitary surface for thawing or staging food or assisting with another task related to the multi-function sink system. The platform 110 may also be mounted (i.e., removably coupled, etc.) within the sink basin 10 (e.g., resting on ledges 22 or 24) in order to conceal dirty dishes resting on the bottom surface 28, for instance.

In an exemplary embodiment, the rails 118 are coupled to opposite sides of the panel 114. In this embodiment, each rail 118 is configured to receive a projection 116 (e.g., nodule, protrusion, etc.) provided on the panel 114 for mating with the rails 118. However, in other embodiments the rails 118 may be coupled to the panel 114 in another manner suitable for the particular application of the platform 110. In still other embodiments, the platform 110 may be a single piece including both the rails 118 and the panel 114. In an exemplary embodiment, the rails 118 are configured to be received or supported by the ledges 22, 24, and/or 26, such that the platform 110 is held above the bottom surface 28 of the sink basin 10. In some embodiments, the platform 110 is supported by ledges 26 such that the rails 118 contact the bottom surface 28 of the sink basin 10, such as to block objects within the sink basin 10 from reaching the drain 30. In the illustrated embodiment of FIGS. 20-22, the rails 118 include a slanted or angled surface 120 to approximate the angle of ledges 22, 24, and 26. The angled surfaces 120 are intended to provide a sufficient contact surface for mating the rails 118 with ledges 22, 24, or 26, so that the ledges 22, 24, or 26 support the platform 110. In an exemplary embodiment, the rails 118 are at least partially made from a talc-filled polypropylene so that the user is able to slide the platform 110 laterally within the sink basin 10. The talc filling the polypropylene is at least partially intended to prevent the platform 110 from floating when the sink basin 10 is filled with water or other liquid. In other embodiments, the rails 118 and any other components of the platform 110 may be made from another material suitable for the particular application of the platform 110.

In an exemplary embodiment, the length of the platform 110 is approximately equal to the width of the sink basin 10, such that the rails 118 rest on the ledges 22, 24, and/or 26. In this embodiment, sides 122 and 124 of the platform 110 each have a length approximately equal to the length of walls 16 and 18, so that the sides 122 and 124 extend from wall 14 to wall 20. In one embodiment, the length of the sink basin 10 (i.e., the length of walls 14 and 20) is at least three times greater than the width of the platform 110 (i.e., the length from side 122 to side 124), such that the sink basin 10 may accommodate up to three substantially adjacent platforms 110 (or other types of sink accessories such as those described herein) on a single set of ledges 22, 24, or 26. In other embodiments, the sink basin 10 and platform 110 may be sized such that the sink basin 10 accommodates a greater or lesser number of platforms 110 on each set of ledges 22, 24, or 26.

Referring now to FIGS. 23-25, various sink accessories are shown positioned within the sink basin 10 according to various exemplary embodiments of the multi-function sink system. In the embodiments shown, each set of ledges 22, 24, and 26 is configured to support or receive more than one sink accessory (e.g., colander 40, cutting board 60, grate 80, wash bin 90, platform 110, etc.), and multiple sink accessories may be positioned at each level (i.e., onto each set of ledges 22, 24, and 26) within the sink basin 10. In one embodiment, each of the sink accessories has a substantially equal width, such that the sink accessories are interchangeable on the ledges 22, 24, and/or 26 within the sink basin 10. In other embodiments, the sink accessories have varying sizes and shapes but are configured to be supported by each of the ledges 22, 24, and 26. In an exemplary embodiment, each set of ledges 22, 24, and 26 is configured to support up to three sink accessories, with the length of the sink basin 10 being at least three times the width of each of the sink accessories. In this embodiment, the sink basin 10 and sink accessories are sized such that when three sink accessories are positioned on a single set of ledges 22, 24, and/or 26, there is enough space between the sink accessories so that a user may remove and/or replace one of the sink accessories from the sink basin 10. In other embodiments, the sink basin 10 may be configured to support a greater or lesser number of sink accessories on each set of ledges 22, 24, and 26.

In the illustrated embodiments of FIGS. 23-25, the sink accessories are removably and slidably positioned within the sink basin 10 (i.e., the sink accessories are removable and replaceable within the multi-function sink system and the sink accessories are slidable along a set of ledges 22, 24, and/or 26 when positioned within the sink basin 10). For instance, a user of the multi-function sink system may utilize a sink accessory at a given height (i.e., when positioned onto a set of ledges 22, 24, or 26), then remove the sink accessory and position the sink accessory at a different height within the sink basin 10 (i.e., onto another set of ledges 22, 24, or 26), as may be useful or necessary for a specific task or for the specific user. The user may also slide one or more sink accessories laterally in either direction on a set of ledges 22, 24, or 26, moving or aligning the one or more sink accessories to assist with performing one or more tasks. For instance, the user may slide a first sink accessory laterally along a set of ledges 22, 24, or 26 in order to move the first sink accessory to a more useful location, or to position a second sink accessory in the space formerly occupied by the first sink accessory.

In the illustrated embodiment of FIG. 23, the colander 40 and the cutting board 60 are positioned within the sink basin 10. The colander 40 and the cutting board 60 are supported by the ledges 22, holding the colander 40 and the cutting board 60 a distance above the bottom surface 28. In this embodiment, the colander 40 and the cutting board 60 are configured such that the border 42 of the colander 40 and the cutting surface 62 of the cutting board 60 rest even with or at least partially below the lip 12 of the sink basin 10 when positioned onto the ledges 22. The colander 40 and the cutting board 60 are slidably positioned within the sink basin 10, such that the colander 40 and the cutting board 60 are configured to slide laterally along the ledges 22 as may be useful or necessary for the particular application of the colander 40 and the cutting board 60. The colander 40 and the cutting board 60 may also be removed and re-positioned within the sink basin 10 on another set of ledges 24 or 26. Further, the colander 40 and the cutting board 60 may be removed and replaced by another sink accessory that is more useful or necessary to a specific task associated with the multi-function sink system.

In the illustrated embodiment of FIG. 24, the grate 80 and the wash bin 90 are positioned within the sink basin 10. In this embodiment, the wash bin 90 is substantially supported by the ledges 24. The ledges 24 may hold the wash bin 90 a distance above the bottom surface 28. In another embodiment, the rests 104 of the wash bin 90 may contact the bottom surface 28 to provide additional support for the wash bin 90. The grate 80 is positioned within the sink basin 10 directly above the wash bin 90. The grate 80 is supported by the ledges 22 and held a distance above the wash bin 90 and the bottom surface 28 of the sink basin 10. The grate 80 and the wash bin 90 are configured to slide along ledges 22 and 24, respectively. The grate 80 and the wash bin 90 may also be moved from their current respective positions within the sink basin 10 to another level of the sink basin 10 (i.e., onto another set of ledges 22, 24, or 26). Further, the grate 80 and wash bin 90 may be removed from the sink basin 10 and replaced by another sink accessory that is more useful or necessary to a specific task associated with the multi-function sink system.

In the illustrated embodiment of FIG. 25, the cutting board 60, the grate 80, and the platform 110 are positioned within the sink basin 10. In this embodiment, the platform 110 is supported by the ledges 26. The rails 118 of the platform 110 contact the bottom surface 28, providing additional support for the platform 110. The platform 110 is positioned over the drain 30, providing a generally planar (i.e., flat, etc.) and sanitary surface at the bottom of the sink basin 10. The grate 80 is positioned above the platform 110 and is supported by the ledges 24. The ledges 24 hold the grate 80 a distance above the platform 110 and the bottom surface 28. The grate 80 may be used to hold clean dishes for drying, or for another application of the multi-function sink system. The cutting board 60 is positioned at a level above the grate 80 and is supported by the ledges 22. The ledges 22 hold the cutting board 60 a distance above the bottom surface 28. The cutting board 60 may be used to cut, sort, or otherwise prepare food products, or for another application of the multi-function sink system. The platform 110, the grate 80, and the cutting board 60 are all slidable within the sink basin 10 and along ledges 22, 24, or 26. The platform 110, the grate 80, and the cutting board 60 are also removable and replaceable, such that each may be removed and replaced by another sink accessory more suitable for the particular application of the multi-function sink system. Although three sink accessories are shown positioned within the sink basin 10 in the illustrated embodiment of FIG. 25, a greater or lesser number of sink accessories may be positioned within the sink basin 10 in other embodiments, as may be suitable for the particular application of the sink basin 10 and/or the multi-function sink system.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A sink basin, comprising:
a bottom surface having a drain;
a front wall and a rear wall that is opposite the front wall, the front wall and the rear wall each extending upward from the bottom surface;
wherein the front wall includes a first ledge that extends upward and away from a center of the drain, and a first transition that extends upward and inward toward the center of the drain to terminate at the first ledge;
wherein the rear wall includes a second ledge that extends upward and away from the center of the drain, and a second transition that extends upward and inward toward the center of the drain to terminate at the second ledge; and
wherein the first ledge and the second ledge are positioned at a first height above the bottom surface.

2. The sink basin according to claim 1, further comprising a lip at a top of the front wall and at a top of the rear wall, the lip being formed around an opening of the sink basin; wherein a first termination between the first ledge and the first transition is parallel with the lip at the top of the front wall, and a second termination between the second ledge and the second transition is parallel with the lip at the top of the rear wall.

3. The sink basin according to claim 2, wherein the first ledge of the front wall and the second ledge of the rear wall each extend upward and outward to terminate at the lip.

4. The sink basin according to claim 1, further comprising a first side wall extending upward from the bottom surface and between the front wall and the rear wall, and further comprising a second side wall extending upward from the bottom surface and between the front wall and the rear wall, the first side wall being opposite the second side wall; wherein the first ledge and the second ledge extend from the first side wall to the second side wall.

5. The sink basin according to claim 1, further comprising a lip at a top of the front wall and at a top of the rear wall, wherein the first ledge extends upward and away from the center of the drain at a first angle relative to the lip, and the second ledge extends upward and away from the center of the drain at the first angle relative to the lip.

6. The sink basin according to claim 5, wherein the first wall and the second wall are mirror images of each other.

7. The sink basin according to claim 1, wherein the front wall includes a third ledge that extends upward and away from the center of the drain to terminate at the first transition, and the rear wall includes a fourth ledge that extends upward and away from the center of the drain to terminate at the second transition, wherein the first and second ledges are proximate a top of the associated front/rear wall, and wherein the third and fourth ledges are proximate the bottom surface.

8. The sink basin according to claim 7, wherein the first ledge and the third ledge are parallel with each other, and the second ledge and the fourth ledge are parallel to each other.

9. The sink basin according to claim 8, wherein the first ledge is positioned directly above the third ledge, and the second ledge is positioned directly above the fourth ledge.

10. The sink basin according to claim 7, wherein the first ledge and the second ledge are configured to support a sink accessory at a first height above the bottom surface, and the third ledge and the fourth ledge are configured to support the sink accessory at a second height above the bottom surface that is lower than the first height.

11. The sink basin according to claim 7, wherein the front wall includes a third transition that extends upward and inward toward the center of the drain to terminate at the third ledge, and the rear wall includes a fourth transition that extends upward and inward toward the center of the drain to terminate at the fourth ledge.

12. The sink basin according to claim 11, wherein the front wall includes a fifth ledge that extends upward and away from the center of the drain to terminate at the third transition, and the rear wall includes a sixth ledge that extends upward and away from the center of the drain to terminate at the fourth transition.

13. The sink basin according to claim 12, wherein the front wall includes a fifth transition that extends upward from the bottom surface to terminate at the fifth ledge, and the rear wall includes a sixth transition that extends upward from the bottom surface to terminate at the sixth ledge.

14. The sink basin according to claim 13, wherein a top of the first ledge and at a top of the second ledge each terminate at a lip.

15. A sink system, comprising:
a sink basin comprising:
   a bottom surface having a drain;
   an lip formed around an upper opening of the sink basin;
   a first wall extending between the bottom surface and the lip, the first wall including a first ledge at a first height and a second ledge at a second height below the first height, the first ledge extending at a first oblique angle relative to the lip and the second ledge each extending at a second oblique angle relative to the lip; and
   a second wall extending between the bottom surface and the lip and being opposite the first wall, the second wall including a third ledge at the first height and a fourth ledge at the second height, the third ledge extending at a third oblique angle relative to the lip and the fourth ledge each extending at a fourth oblique angle relative to the lip; and
a sink accessory, the sink accessory being configured to be supported by the first ledge and the third ledge at the first height above the bottom surface, and to be supported by the second ledge and the fourth ledge and the second height above the bottom surface.

16. The sink system according to claim 15, wherein the first ledge is positioned directly above the second ledge and extends upward and away from the center of the drain to terminate at the lip, and the third ledge is positioned directly above the fourth ledge and extends upward and away from the center of the drain to terminate at the lip.

17. The sink system according to claim 15, wherein the sink basin further comprises a third wall extending between the bottom surface and the lip and between the first wall and the second wall, and a fourth wall extending between the bottom surface and the lip and between the first wall and the second wall, wherein the first ledge, the second ledge, the third ledge, and the fourth ledge extend from the third wall to the fourth wall.

18. The sink system according to claim 17, wherein the sink accessory is configured to slide laterally within the sink basin along the first ledge and the second ledge parallel with the lip.

19. The sink system according to claim 15, wherein the first oblique angle and the third oblique angle are the same, and
   wherein the sink accessory includes sides that are slanted to complement the first and third angle.

20. The sink system according to claim 15, wherein the first wall includes a first transition that extends upward and inward toward the center of the drain and between the first ledge and the second ledge, and wherein the second wall includes a second transition that extends upward and inward toward the center of the drain and between the third ledge and the fourth ledge.

* * * * *